Feb. 6, 1968     H. GANG     3,367,568
MULTIPLICATION CONTROL MEANS
Filed Jan. 16, 1964     22 Sheets-Sheet 2
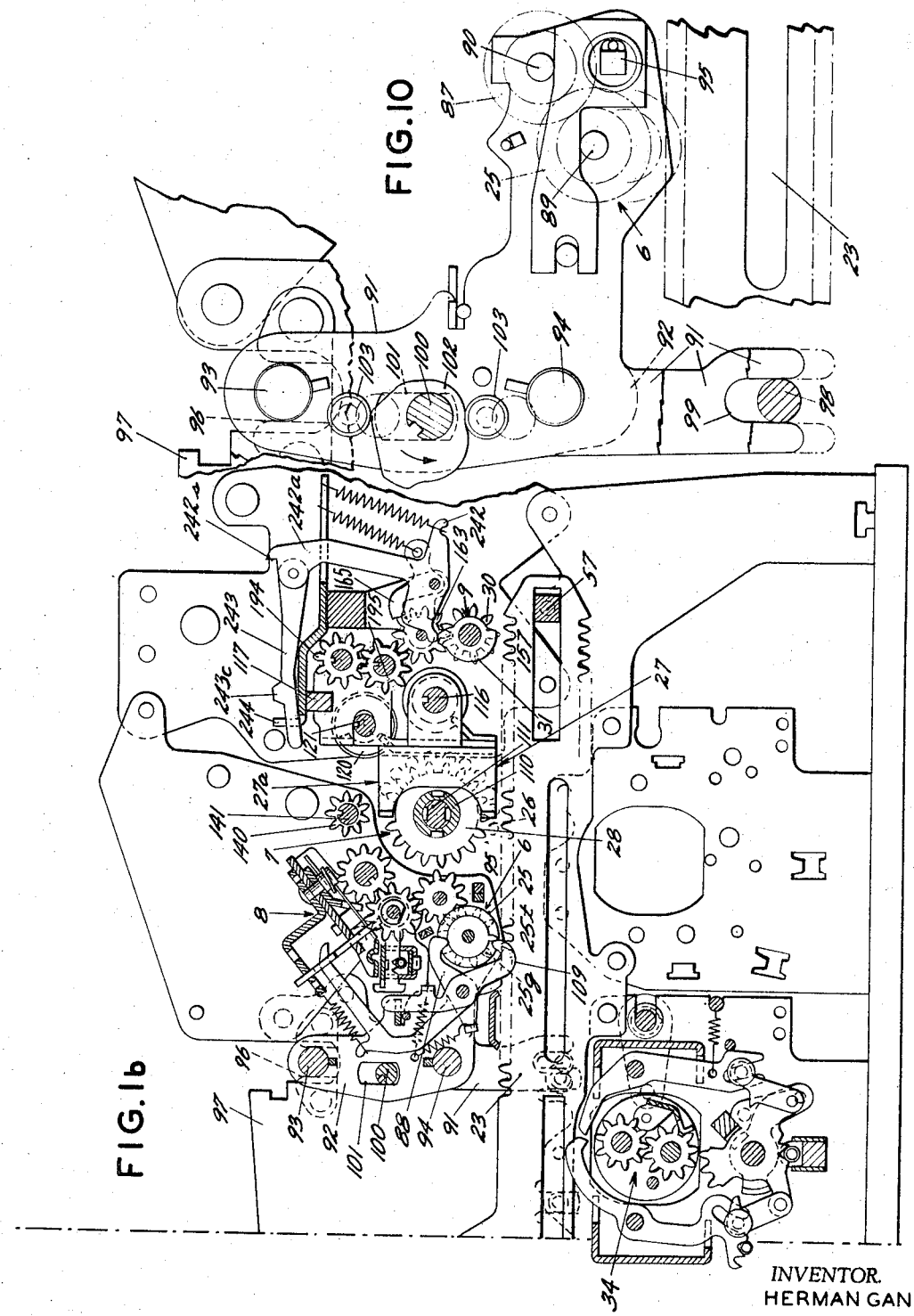
INVENTOR.
HERMAN GANG
BY
*George V. Hall*
ATTORNEY

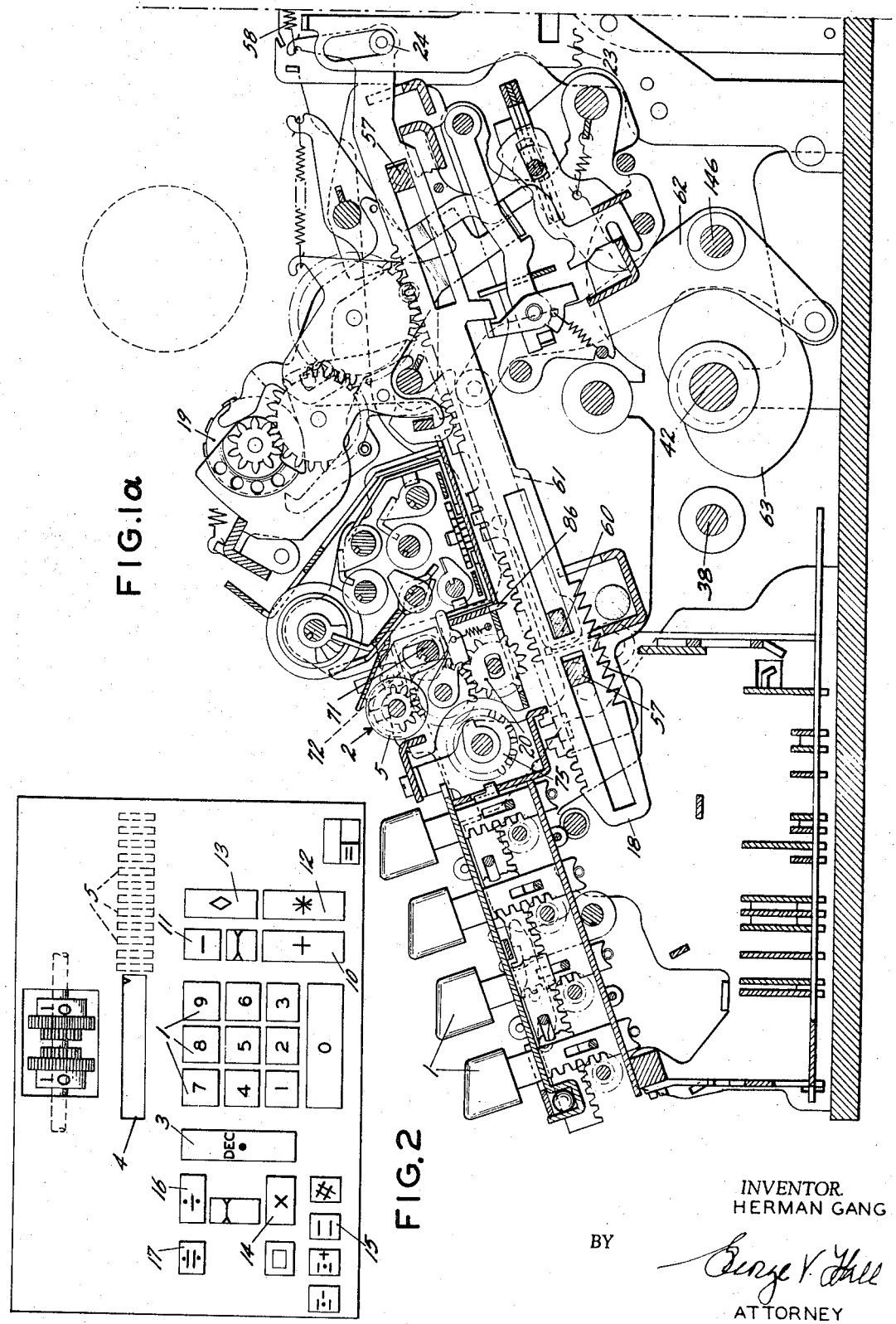

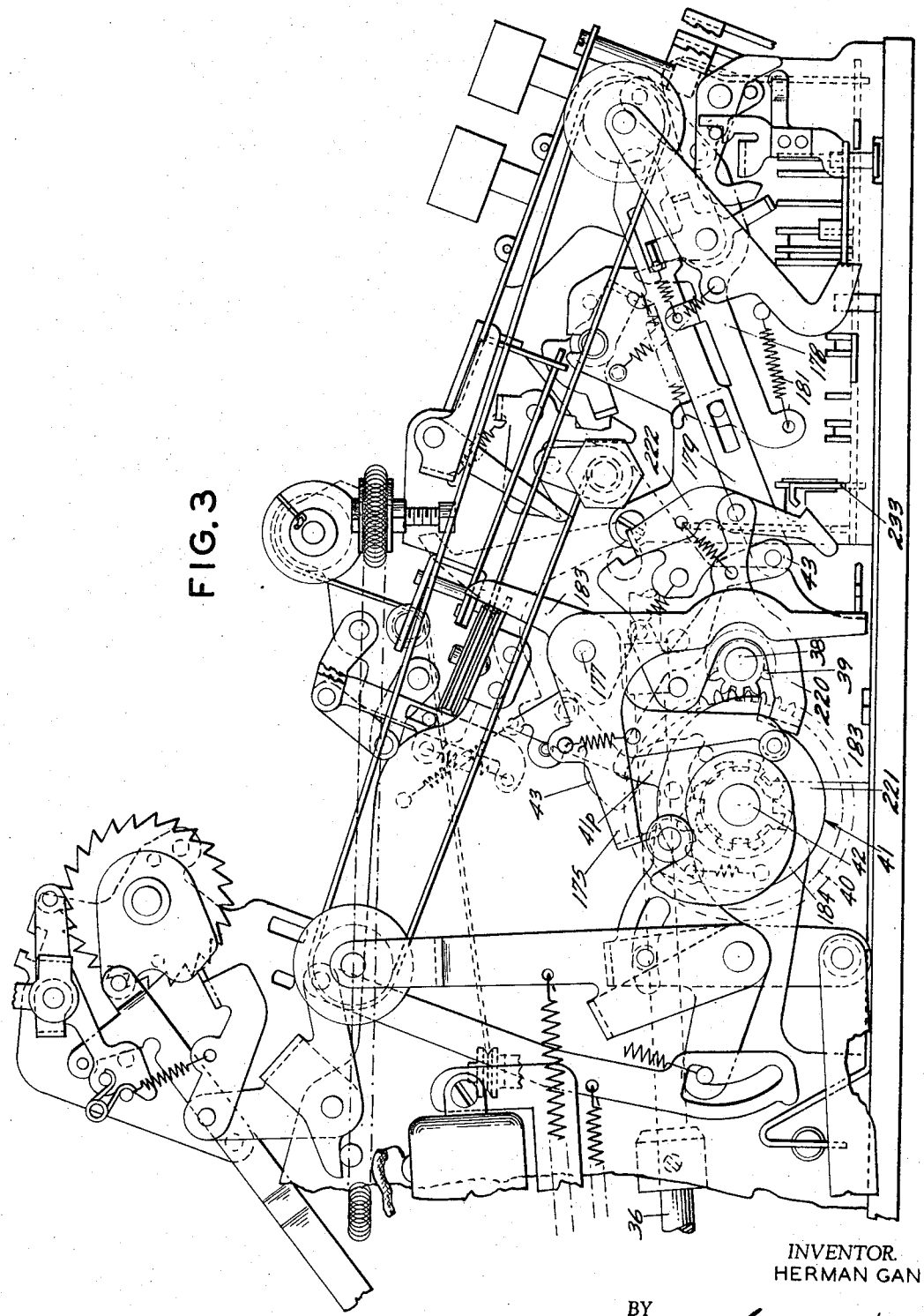

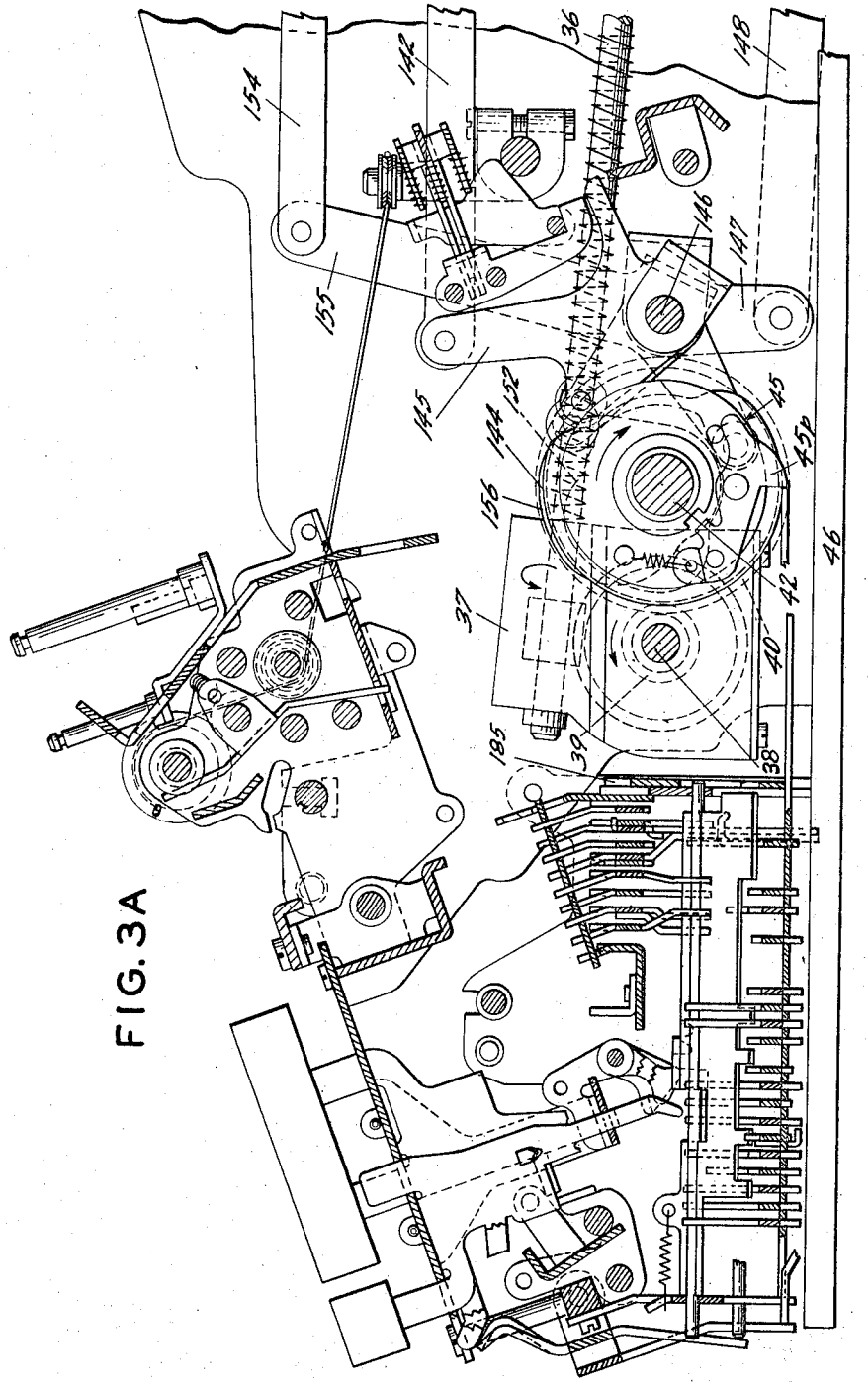

Feb. 6, 1968 H. GANG 3,367,568
MULTIPLICATION CONTROL MEANS
Filed Jan. 16, 1964 22 Sheets-Sheet 5

INVENTOR.
HERMAN GANG
BY
ATTORNEY

INVENTOR.
HERMAN GANG

Feb. 6, 1968  H. GANG  3,367,568
MULTIPLICATION CONTROL MEANS
Filed Jan. 16, 1964  22 Sheets-Sheet 10

FIG. 11

INVENTOR.
HERMAN GANG
BY
*George V. Hall*
ATTORNEY

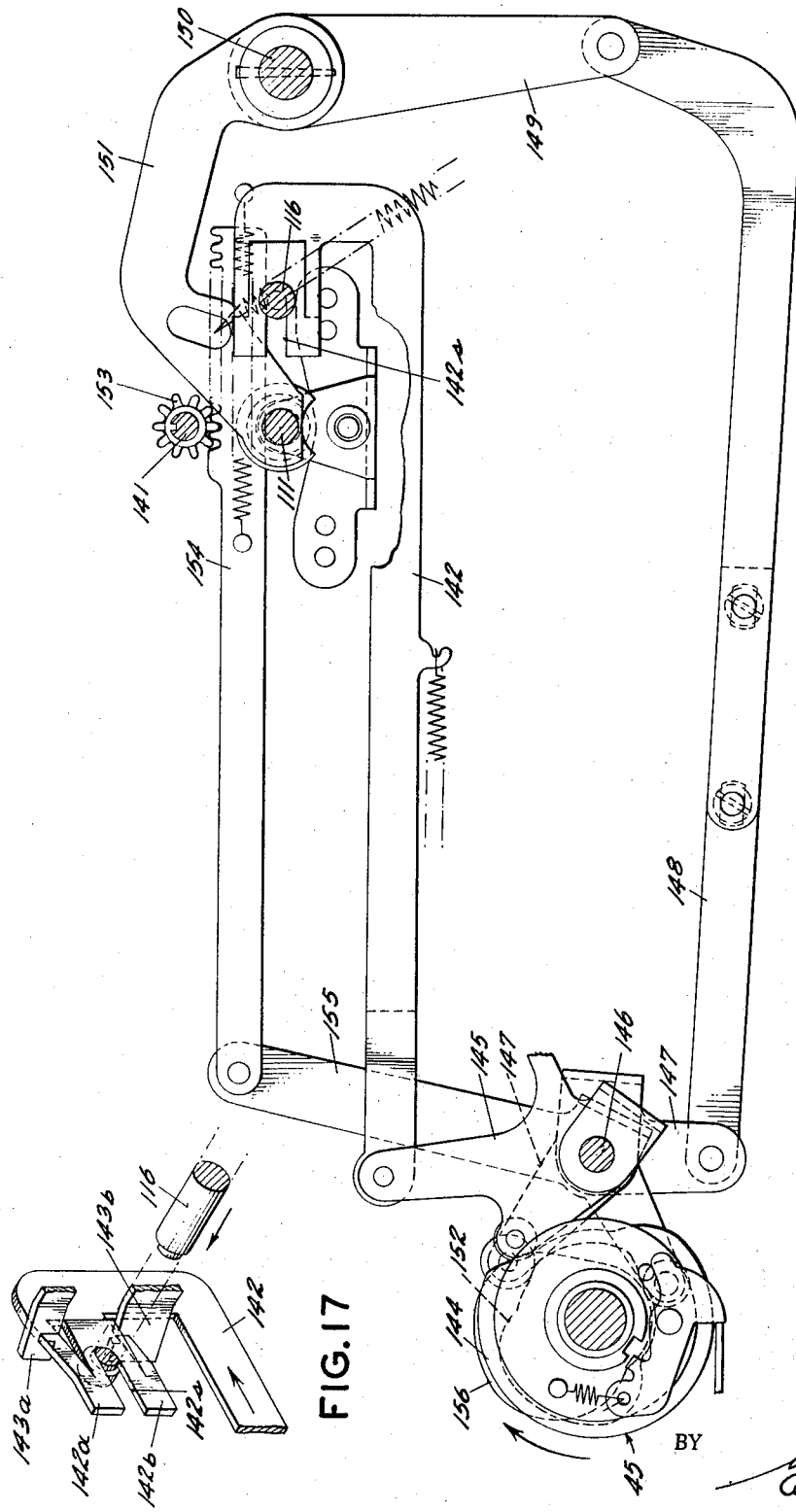

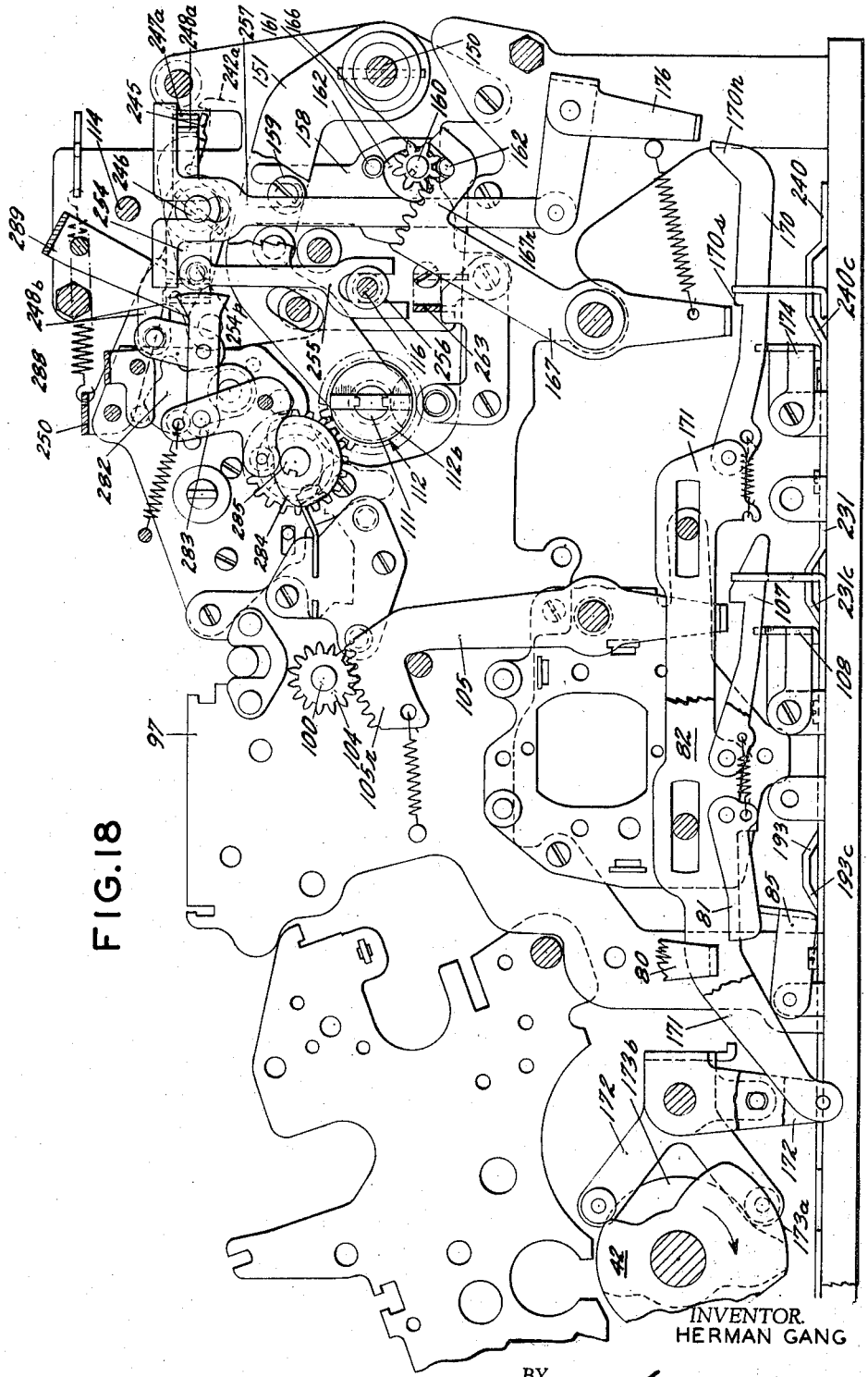

Feb. 6, 1968   H. GANG   3,367,568
MULTIPLICATION CONTROL MEANS
Filed Jan. 16, 1964   22 Sheets-Sheet 17

INVENTOR.
HERMAN GANG
BY
ATTORNEY

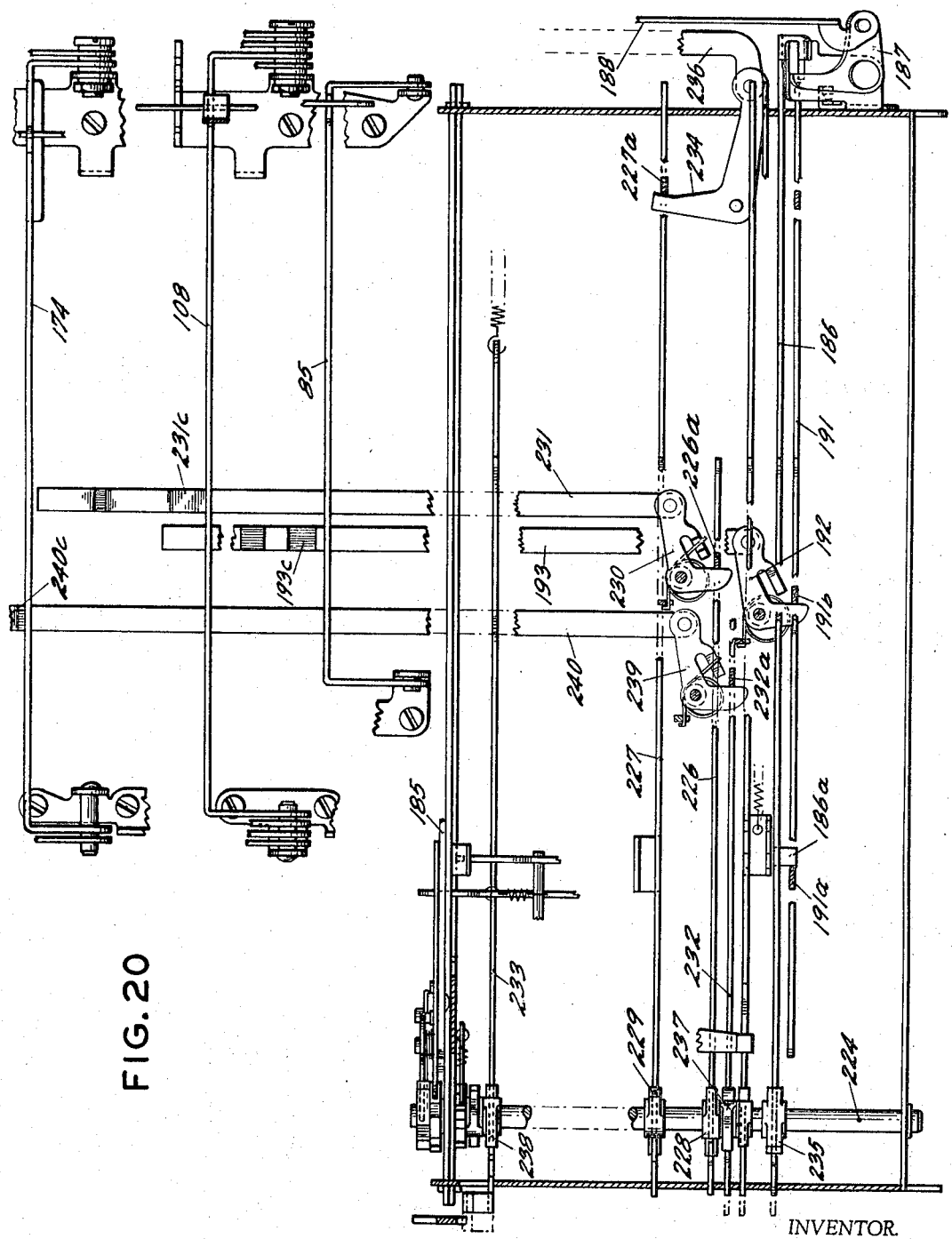

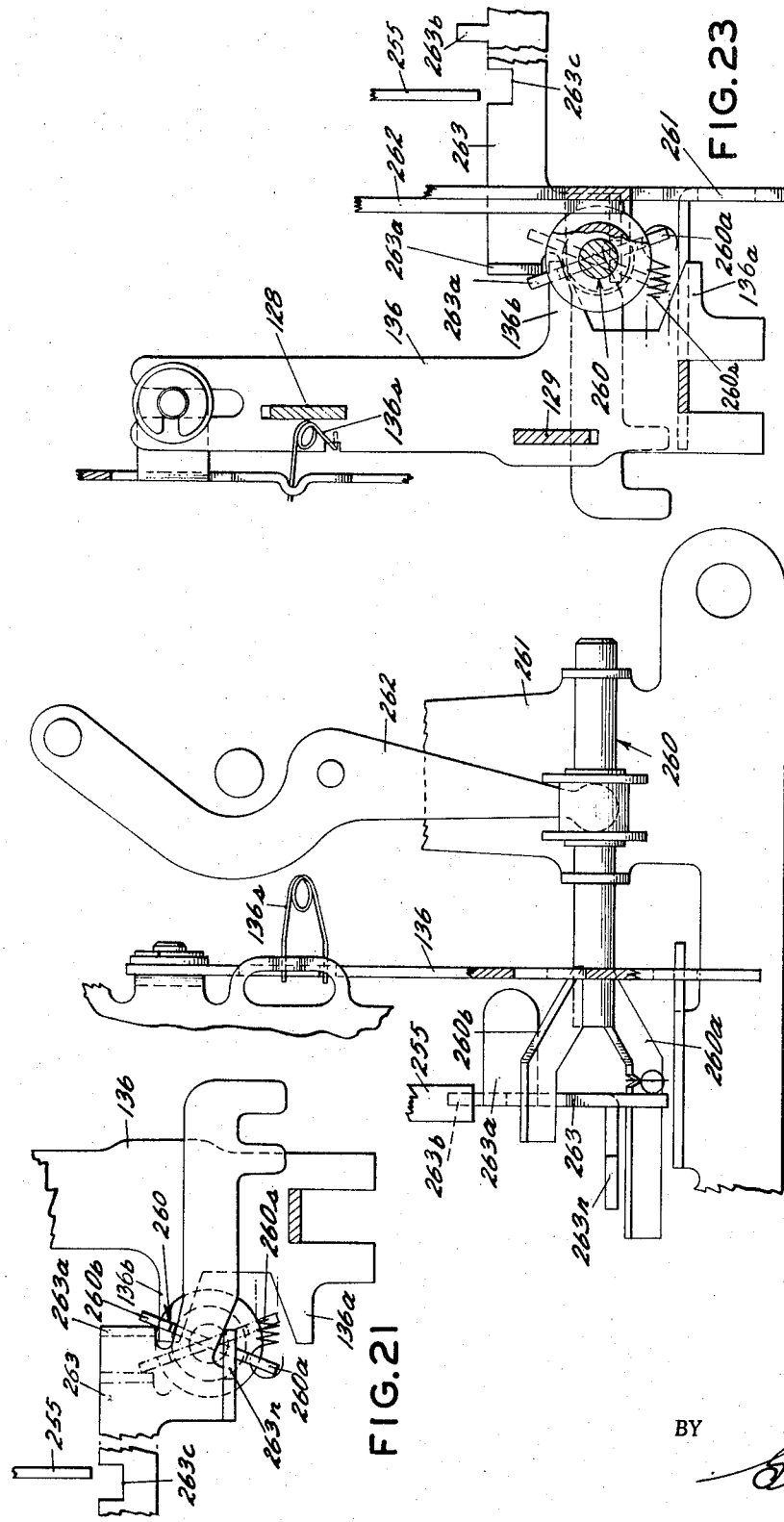

Feb. 6, 1968  H. GANG  3,367,568
MULTIPLICATION CONTROL MEANS
Filed Jan. 16, 1964  22 Sheets-Sheet 20

INVENTOR.
HERMAN GANG
BY
George V. Hall
ATTORNEY

Feb. 6, 1968   H. GANG   3,367,568
MULTIPLICATION CONTROL MEANS
Filed Jan. 16, 1964   22 Sheets-Sheet 21

INVENTOR.
HERMAN GANG
BY
*George V. Hall*
ATTORNEY

INVENTOR.
HERMAN GANG

BY George V. Hall
ATTORNEY

United States Patent Office 3,367,568
Patented Feb. 6, 1968

3,367,568
MULTIPLICATION CONTROL MEANS
Herman Gang, Morris Plains, N.J., assignor to Litton Business Systems, Inc., a corporation of New York
Filed Jan. 16, 1964, Ser. No. 338,242
27 Claims. (Cl. 235—60)

This invention relates to mechanism for performing multipication in calculating machines, and particularly in machines of the type having rotary differential digital actuators and means for effecting relative ordinal shift between such actuators and a product register.

It is the primary object of the invention to provide multiplication control mechanism which will effect increased calculating speed with respect to the cycling speed of the rotary actuators in a machine of the above type.

A more specific object is to provide novel shortcut multiplication control means in a machine of the above type.

A still more specific object is to adapt the shortcut multiplication control means to a machine wherein the rotary actuators are unidirectional.

The machine in which the devices of the invention are herein disclosed includes rotary differentially settable digital actuators in which a multiplicand is set and which are ordinally shiftable with respect to a fixed product register. The actuators are unidirectional and subtraction is effected by additive complemental registration.

An ordinal series of multiplier storage devices are ordinally fixed with respect to the product register, and means shiftable with the digital actuators is operable to count out the multiplier digits successively from the storage devices and to control cycling and shift of the actuators in a novel shortcut method of operation.

Reciprocatory actuator racks are alternatively operable to enter a selected multiplicand value in the rotary actuators and a multiplier value into the multiplier storage devices. The excursions of the racks are controlled by a selector carriage into which a value is set upon successive depression of keys of a ten key keyboard corresponding to the digits of the value from higher to lower orders in the usual manner.

Digit type members of printing mechanism are adjusted from normal zero position in accordance with the excursions of the actuator racks and then the printing mechanism is operated. After the printing operation, the racks in their return strokes, restore the type members. Accordingly operation of the racks in entry of a multiplicand and a multiplier will adjust the type members for printing of those factors.

At the conclusion of a program of multiplication, excursions of the racks are controlled in a total taking operation in accordance with the values in the product register to print a product.

In the following description with reference to the accompanying drawings other objects and advantages of the invention will be apparent.

In the drawings:

FIGS. 1a and 1b are a longitudinal section through the machine embodying the invention.

FIG. 2 is a plan view of the keyboard.

FIG. 3 is a left side view of the front portion of the machine including the main clutch and controls therefor.

FIG. 3A is a longitudinal section through the front portion of the machine showing the machine drive means including the auxiliary clutch driven by the main clutch.

FIG. 10 is a fragmentary detail of the adjusting means for the product register.

FIG. 11 is a plan view of the rotary digital actuators and their carriage, the carriage shifting means, and the multiplier storage register.

FIG. 14A is a detail side elevation of a part of the control mechanism for the registration and shift clutches.

FIG. 16 is a detail side elevation of mechanism operable in clearing of the rotary digital actuators and entering a new value therein.

FIG. 17 is a fragmentary perspective of parts of FIG. 16.

FIG. 18 is a right side elevation of mechanism for conditioning the machine for product registration.

FIG. 20 is a plan view of the program slides and associated mechanism.

FIGS. 21, 22, and 23 are detail views of the carriage shift direction control means.

Figure 24:
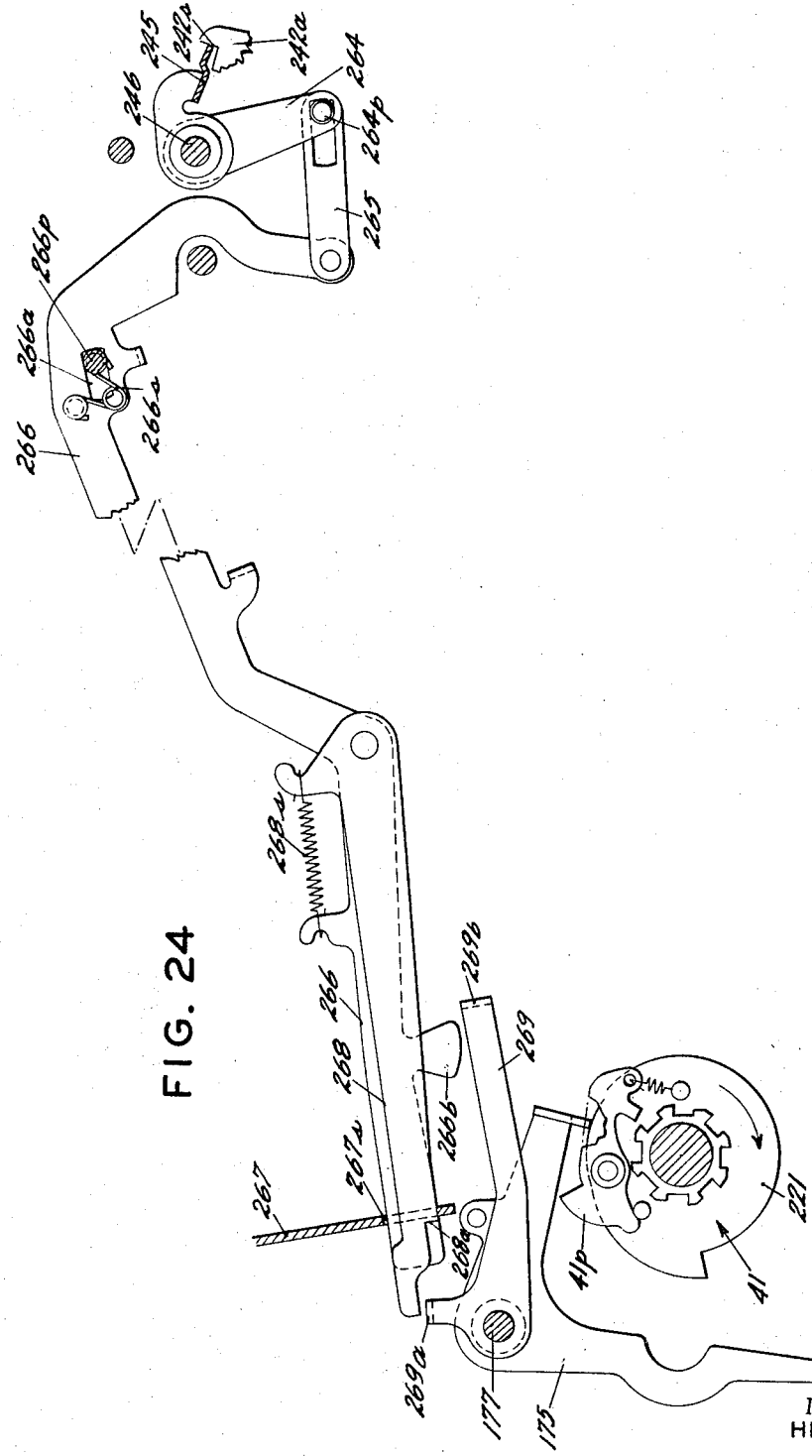

FIG. 24 is a detail right side view of mechanism operable in control of the main clutch in total taking operations.

Figure 25:
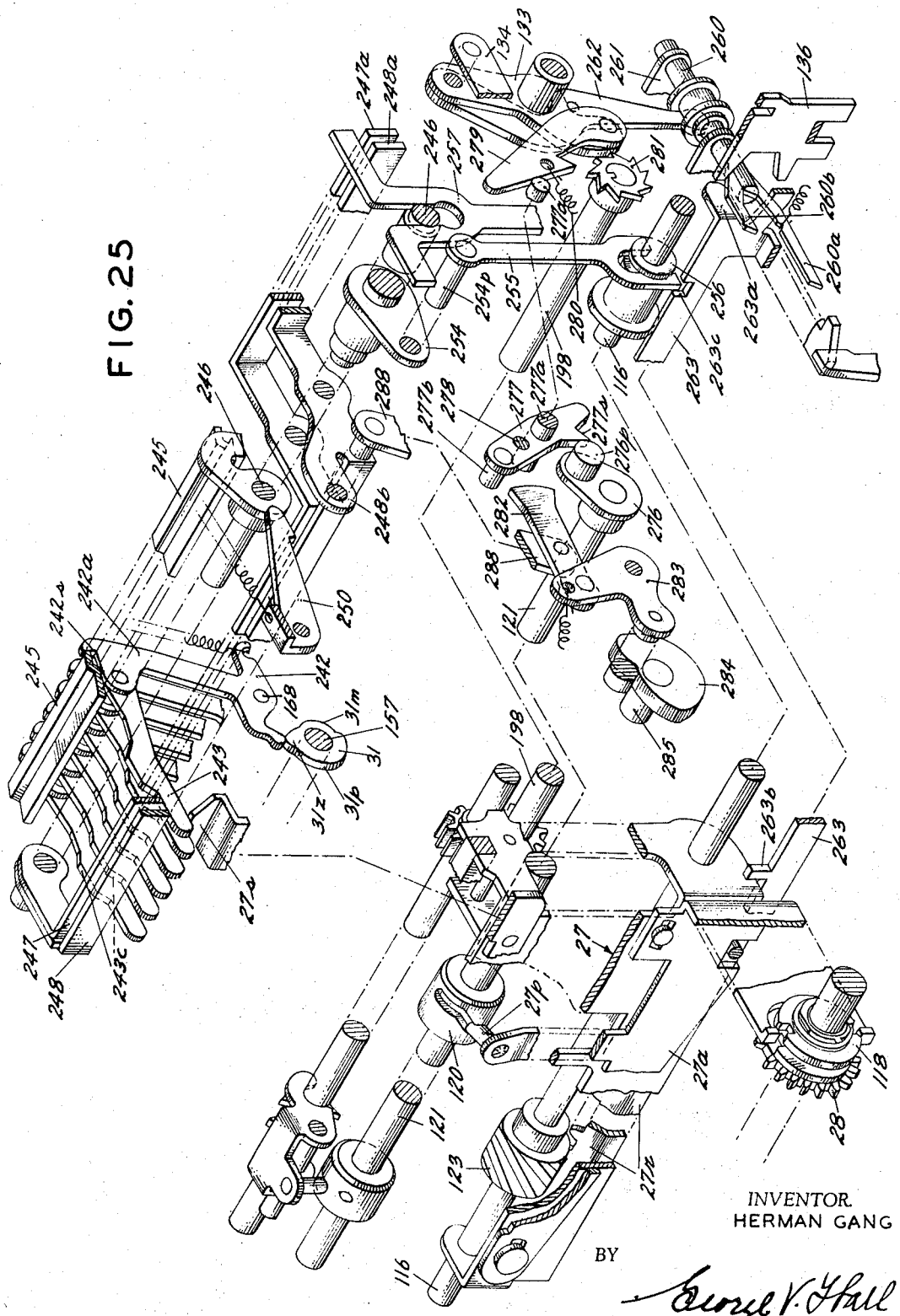

FIG. 25 is an exploded perspective of the registration and shift control mechanism operable in product registration.

Figure 26:
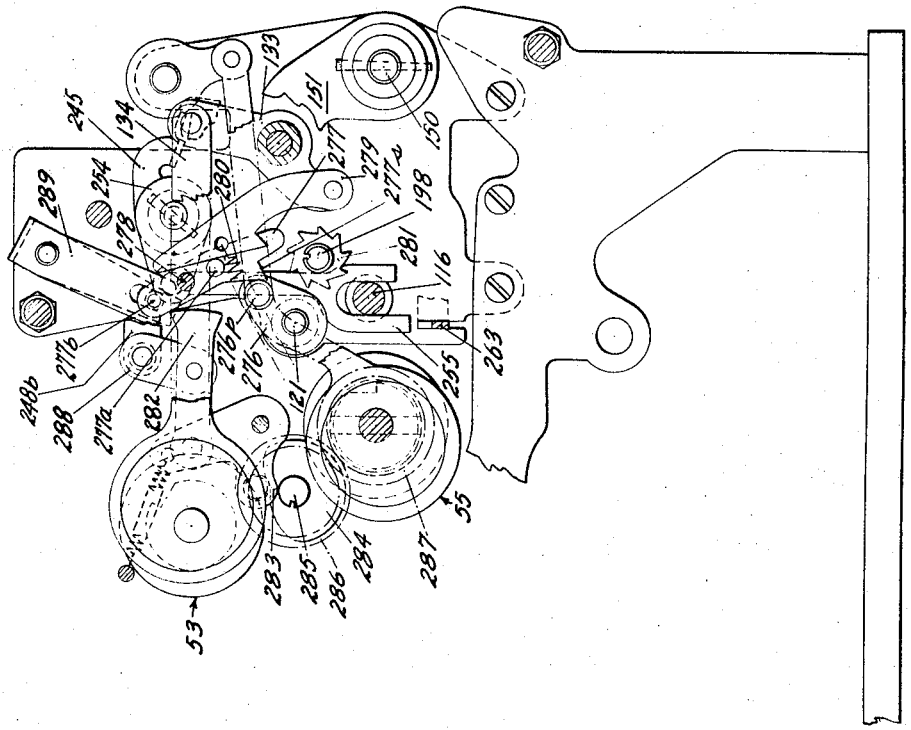

FIG. 26 is a detail side elevation of the means for shortcutting the multiplying operation.

Figure 27:
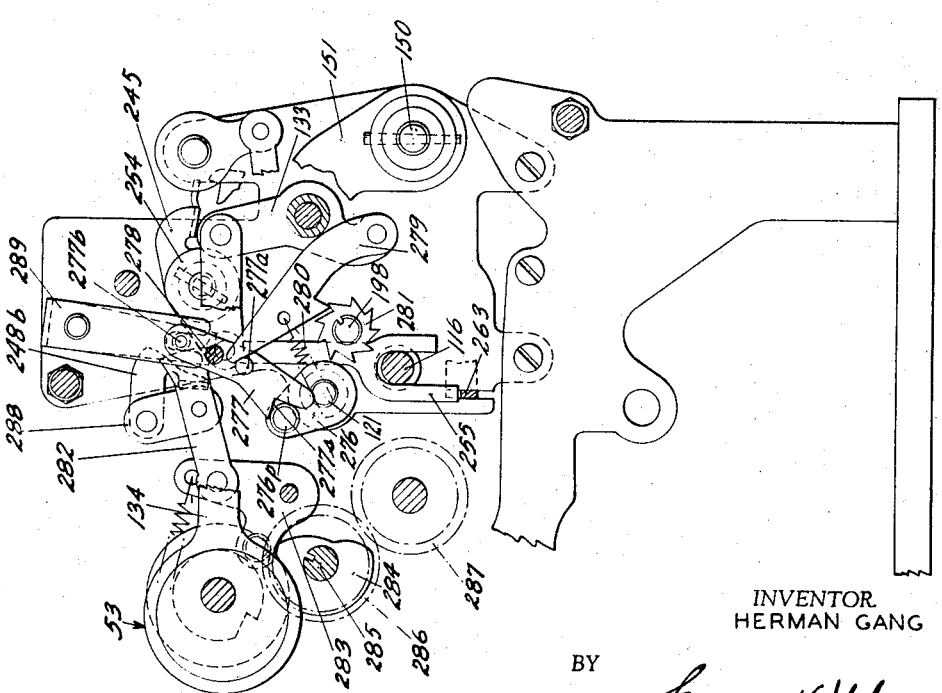

FIG. 27 is a view of the parts of FIG. 26 in an operated position.

*General description*

Referring to FIGS. 1a, 1b, 2, the machine has, at its front, a keyboard including the usual grouping of numeral keys 1 of the digital values "0" to "9" inclusive, for controlling entry of selected values into a selector carriage 2 which has a twelve digit capacity as later described. To the rear of keys 1 is a window 4 for displaying numeral wheels 5 which are successively moved into view as digits are entered into carriage 2 and are adjusted in accordance with the values of the digits.

Automatic decimal point printing mechanism is incorporated in the machine. A decimal point key 3 located to the left of keys 1 is adapted to be depressed in proper decimal sequence with keys 1 when a value to be entered into carriage 2 includes decimal digits. The present invention, however, is not concerned with this mechanism which is fully disclosed in applicant's co-pending application Ser. No. 222,144 filed on Sept. 7, 1962 now U.S. Patent No. 3,194,495.

To the right of the numeral keys 1 are function control keys including an add key 10, a subtract key 11, a total key 12, and a subtotal key 13. To the left of the numeral keys 1 are function control keys including a multiplicand entry key 14, and a multiplier entry key 15.

The machine is adapted to perform automatic division including printing of the dividend, divisor, quotient, and remainder. The keyboard therefore includes a dividend entry key 16 and a divisor entry key 17. The present invention however is not concerned with the division program nor to other machine functions to which other keys of the keyboard without designation are related.

There is an ordinal series of twenty-one reciprocatory front digital actuator racks 18, the twelve lowest orders of which may be controlled by selector carriage 2, and entrained with the racks are digit type wheels 19 of a printing unit. Reference is made to the aforenoted application Ser. No. 222,144 for a complete disclosure of the printing unit with which the present invention is not concerned.

Selector carriage 2 includes a series of twelve storage selector gears 20. Selector carriage 2 is normally positioned, in the usual manner, with the highest order selector gear one ordinal position to the right of the lowest order rack 18. Upon successive depression of digit keys 1, the values of the depressed keys respectively are entered into the selector gears from higher to lower orders, and the carriage is step shifted toward the left to bring the set selector gears 20 successively from higher to lower orders into controlling position with respect to racks 18 from lower to higher orders. It will be noted that the racks above the twelfth order are beyond the range of selector carriage 2. These higher order racks along with the lower orders are controlled in total taking from a product dividend register 6 of the machine for printing of a product as later described.

Racks 18 are reciprocably operable in forward and return strokes as later described. Forward stroke refers to the first stroke of each cycle, as is customary, regardless of the direction with respect to the machine. In this machine the forward stroke of the racks is toward the rear of the machine. A rear digital actuator rack 23 is coupled by roller and slot connection 24 with each front digital actuator rack 18. The pairs of racks 18, 23 therefore are reciprocated in unison.

The product-dividend register 6 which is nonshiftable comprises an ordinal series of twenty-one numeral wheels 25. Racks 23 are operable to enter a dividend set in selector carriage 2 into register wheels 25 or to zeroize said wheels in a total taking operation of a value such as a product registered therein.

A digital actuator unit 7 including an ordinal series of twelve rotary differentially settable digital actuators 26 is unidirectionally driven at high speed independently of racks 18 and 23 and is connected with a carriage 27 for ordinal shifting with respect to product-dividend register 6 in programs of multiplication and division. Subtraction is performed by complemental registration and therefore actuator unit 7 includes nonsettable nines complement actuators 26c (FIGS. 11, 12) which are located to the left and are rotatably driven and shifted with differential actuators 26. Values are entered into actuators 26 by racks 23 in accordance with a value entered into selector carriage 2 after operation of means for zeroizing said actuators from a prior setting.

Nonshiftable rotary tens transfer actuators 8 extend the length of the product-dividend register 6 and are operable in time with digital actuators 26, 26c. The invention is not concerned with the operation of the tens transfer actuators and reference is made to applicant's Patent No. 3,065,908 for a complete disclosure.

A nonshiftable multiplier-quotient register 9 comprises an ordinal series of eleven storage gears 30, the ten lowest orders of which are associated with the ten lowest order racks 23 for entry of a multiplier. The eleventh order is provided for shortcut multiplication. The associated racks 23 are operable to enter a value set in selector carriage 2 into gears 30, or to zeroize the gears in a total taking operation of a value registered therein. Counting means shiftable with carriage 27, in which digital actuator unit 7 is mounted, is operable in a program of multiplication, to count out a multiplier registered in gears 30 or to register a quotient therein in a program of division.

Values set in selector carriage 2 may be added or subtracted in an accumulator register 34 by operation of racks 23 in response to depression of add and subtract keys 10, 11. Also values registered in product-dividend register 6 may be transferred to accumulator 34 by operation of racks 23.

The above briefly outlines the organization and relationship of basic machine parts. With this in mind, various of the above and other associated mechanisms will be described in detail as considered necessary for a complete disclosure and understanding of the invention.

*Machine drive*

The machine is driven by an electric motor (not shown) located at the left rear of the machine. The motor may be continuously operated or may be controlled by switch means which is closed upon depression of any one of the function control keys 10–17 or numeral keys 1 of the keyboard in well-known manner. Drive shaft 36 (FIGS. 3, 3A) of the motor extends forwardly to a gear box 37, the gearing of which drives an output shaft 38 extending transversely of the machine and having suitable bearings in the machine side frames.

A pinion 39 is secured at the left end of shaft 38 and engages a spur gear 40 which is fast with the driving member of a cyclically operable main clutch 41. Clutch 41 is of well-known construction wherein the driving member comprising a toothed wheel is adapted to be engaged by a spring urged pawl 41p mounted on the driven member which is secured to the machine main drive shaft 42. Normally a clutch lever 43 is held counterclockwise (FIG. 3) where it is engaged by a nose of pawl 41p to disengage the clutch in full cycle position. Upon clockwise movement of clutch lever 43, pawl 41p will be released to engage clutch 41 which, during each cycle, controls means for reciprocating actuator racks 18, 23 and for operating the printing mechanism. These operations including control of clutch 41 will be described later.

The driving member of an auxiliary clutch 45 is fast on main drive shaft 42 driven by main clutch 41. The driven member of clutch 45 carries a spring urged pawl 45p having a tooth adapted to engage a single recess in the driving member to engage the clutch. A forwardly extending clutch lever 46 has its rear end normally engaging pawl 45p to disengage the clutch.

Lever 46 is rocked to release pawl 45p thereby engaging auxiliary clutch 45. However, it will be noted that the auxiliary clutch can only be operated simultaneously with main clutch 41 which operates main drive shaft 42. Clutch 45 is operated in connection with certain clearing and multiplicand entering operations for digital actuators 26. These operations and the control of clutch 45 will be described later.

Figure 6:
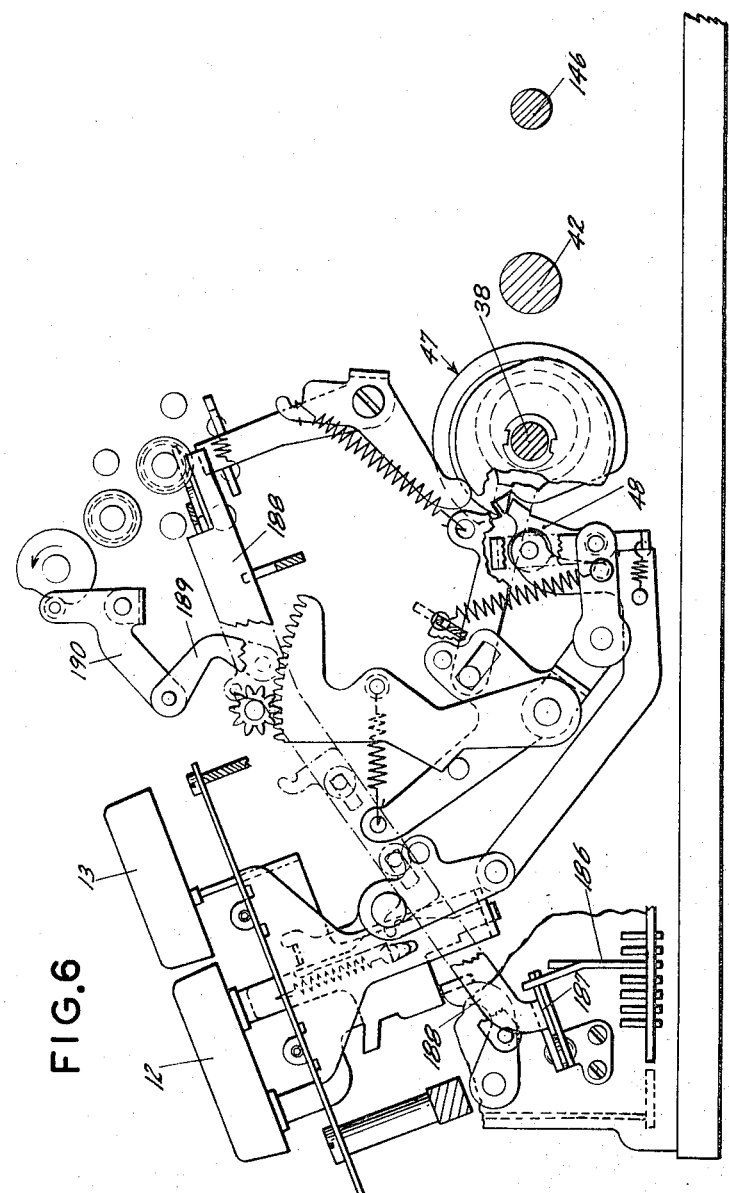
FIG. 6 is a fragmentary side elevation of the single cycle clutch operable in entry of digits in the selector carriage and in control of the carriage escapement means.

A cyclically operable selection clutch 47 (FIG. 6) is located inwardly of the machine right side frame with the driving member of said clutch fixed on output shaft 38 of gear box 37 (FIG. 3A). The clutch is of well-known type similar to main clutch 41. Clutch 47 is normally held disengaged in full cycle position by a clutch lever 48 held clockwise. The clutch is engaged upon counterclockwise movement of lever 48 to release a spring urged pawl on the driven member to engage the driving member of the clutch. Clutch 47 is operable upon each depression of a numeral key 1 in connection with entry of the value of the depressed key into selector carriage 2 and step shifting of said carriage as will be discussed later.

Figure 4:
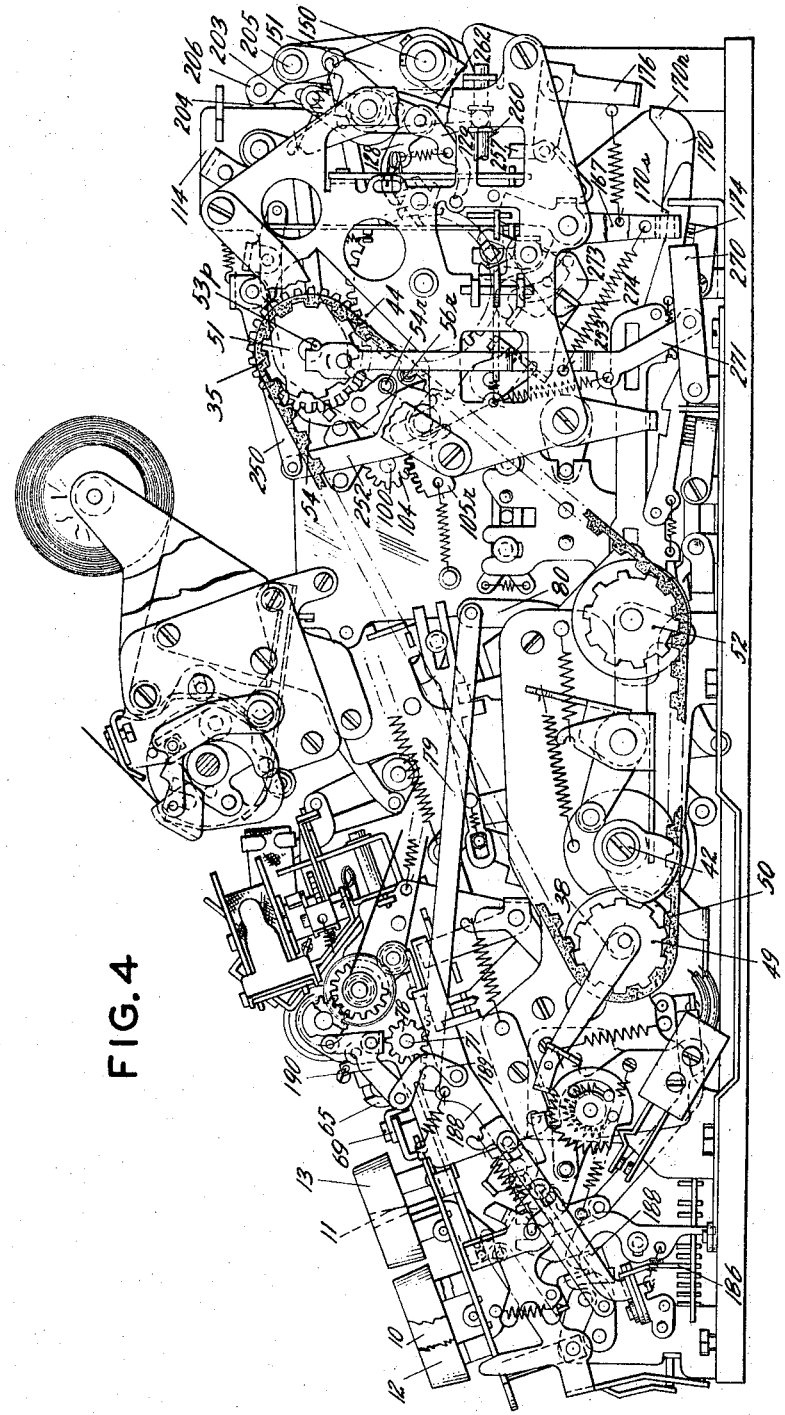
FIG. 4 is a right side elevation of the front portion of the machine showing the drive means for the selection clutch, shift clutch and registration clutch.

A cog wheel 49 (FIG. 4) is fast on the right end of shaft 38 exteriorly of the right side frame. Cog wheel 49 drives a cog belt 50 which, at the upper rear of the machine, drives a cog wheel 51. An idler cog wheel 52 is adjustable to regulate the tension of belt 50.

The driving member of a cyclically operable shift clutch 53 (FIG. 14) is secured for rotation with cog wheel 51. Clutch 53 is of the same general type as main clutch 41 and selection clutch 47. Clutch 53 therefore includes a spring urged pawl on the driven member which is adapted to engage the driving member to engage the clutch. A clutch lever 54 is normally spring held clockwise to engage the clutch pawl and thereby hold the clutch in full cycle disengaged position. Counterclockwise movement of lever 54 will release the clutch pawl to engage the clutch. Clutch 53, during each cycle, as later described, operates means for shifting carriage 27 for digital actuator unit 7 one ordinal position with respect to product-dividend register 6.

A gear 35 (FIG. 4) is fixed for rotation with cog wheel 51 and drives a gear 44. Secured for rotation with gear 44 is the driving member of a registration clutch 55 (FIG. 14) which drives rotary digital actuators 26, 26c of unit 7 as later described. Clutch 55 is of substantially the same structure as shift clutch 53 and therefore includes a spring urged pawl on the driven member which is adapted to engage the driving member to engage the clutch. A clutch lever 56 is normally spring held counterclockwise to engage the clutch pawl and thereby hold the clutch in full cycle disengaged position. Clockwise movement of lever 56 will release the clutch pawl to engage the clutch.

From the above, it will be seen that the driving members of main clutch 41, selection clutch 47, shift clutch 53, and registration clutch 55 are simultaneously operated by the motor, and each therefore is adapted to be engaged for independent operation. However, auxiliary clutch 45 which is driven by main clutch 41 can be operated only when that clutch is operated.

Digital actuator racks

Front and rear digital actuator racks 18, 23 (FIGS. 1a, 1b) which are connected by couplings 24 are supported for reciprocation by fixed transverse members 57 engaging longitudinal slots in the racks. The racks are biased toward the rear of the machine by springs 58 attached to the rear of racks 18; but however are normally held toward the front against the tension of springs 58 by a transverse restore bail 60 engaging the front ends of longitudinal slots in racks 18.

Bail 60 is supported at its ends by a pair of rearwardly extending links 61 each which at its rear is pivotally connected to the end of an upstanding arm of a cam follower comprising a crank 62. Crank 62 is spring biased clockwise to engage a roller at the end of its other arm normally with the high part of a cam 63 fast on main drive shaft 42. Followers 62 therefore are normally held counterclockwise thereby holding links 61, bail 60, and racks 18, 23 forwardly against the tension of springs 58.

During each cycle of main clutch 41, followers 62 will be rocked clockwise and return under control of cams 63 thereby reciprocating bail 60 and permitting racks 18, 23 to be operated in forward strokes by springs 58 and restored in return strokes by said bail. As noted before, the forward strokes are toward the rear of the machine.

The extent of the forward strokes of racks 18, 23 is controlled in accordance with values entered into selector carriage 2 or in taking of a total from product register 6 as later described. In each cycle, there is a dwell before the forward strokes of racks 18, 23. During mid-cycle, there is a dwell of the racks during which printing occurs. Then there is a terminal dwell after return of the racks.

The selector carriage

Figure 5:
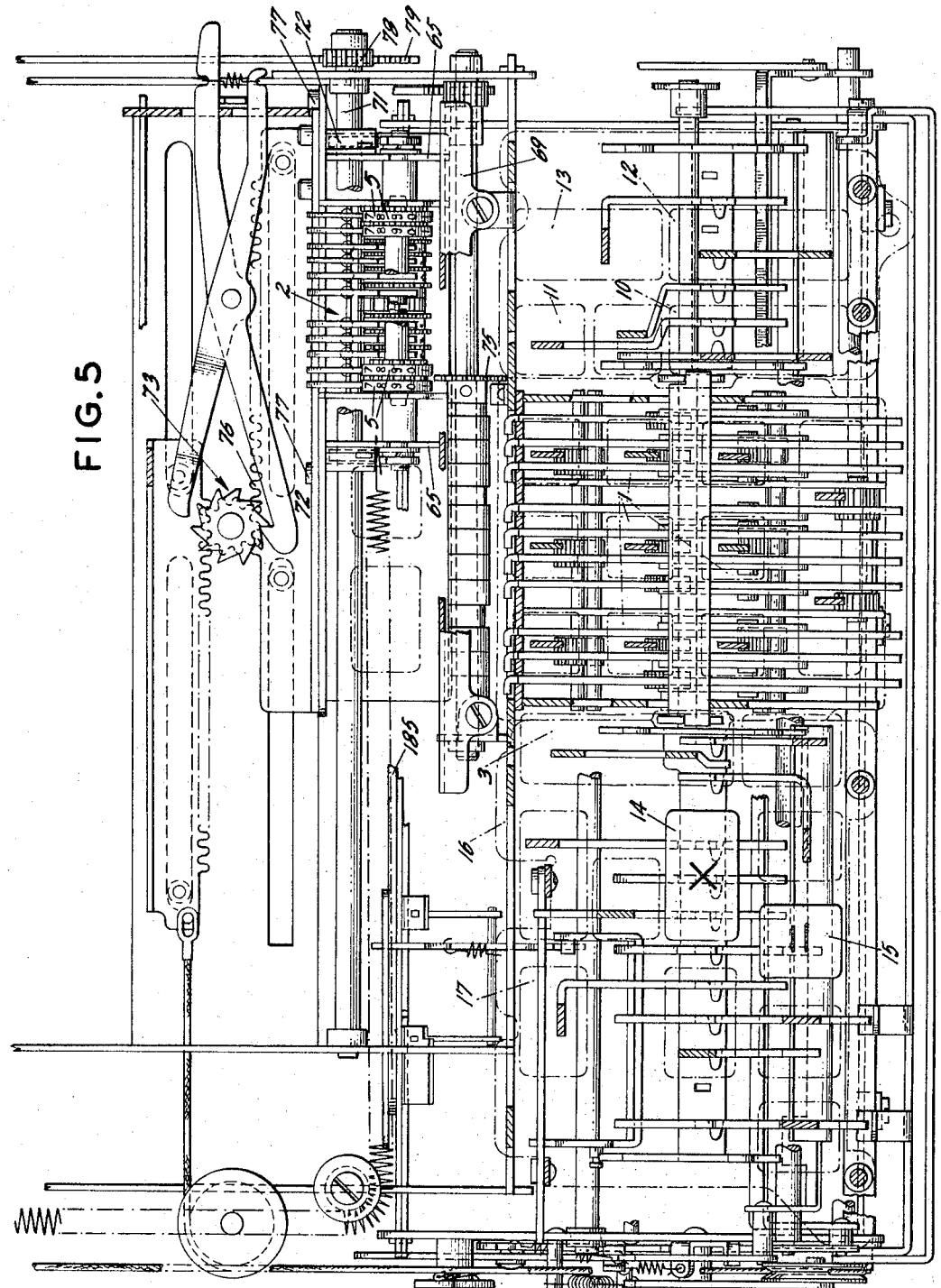
FIG. 5 is a top plan view of the front of the machine with the cover plate removed showing the selector carriage, multiplication keys and associated controls.
Figure 7:
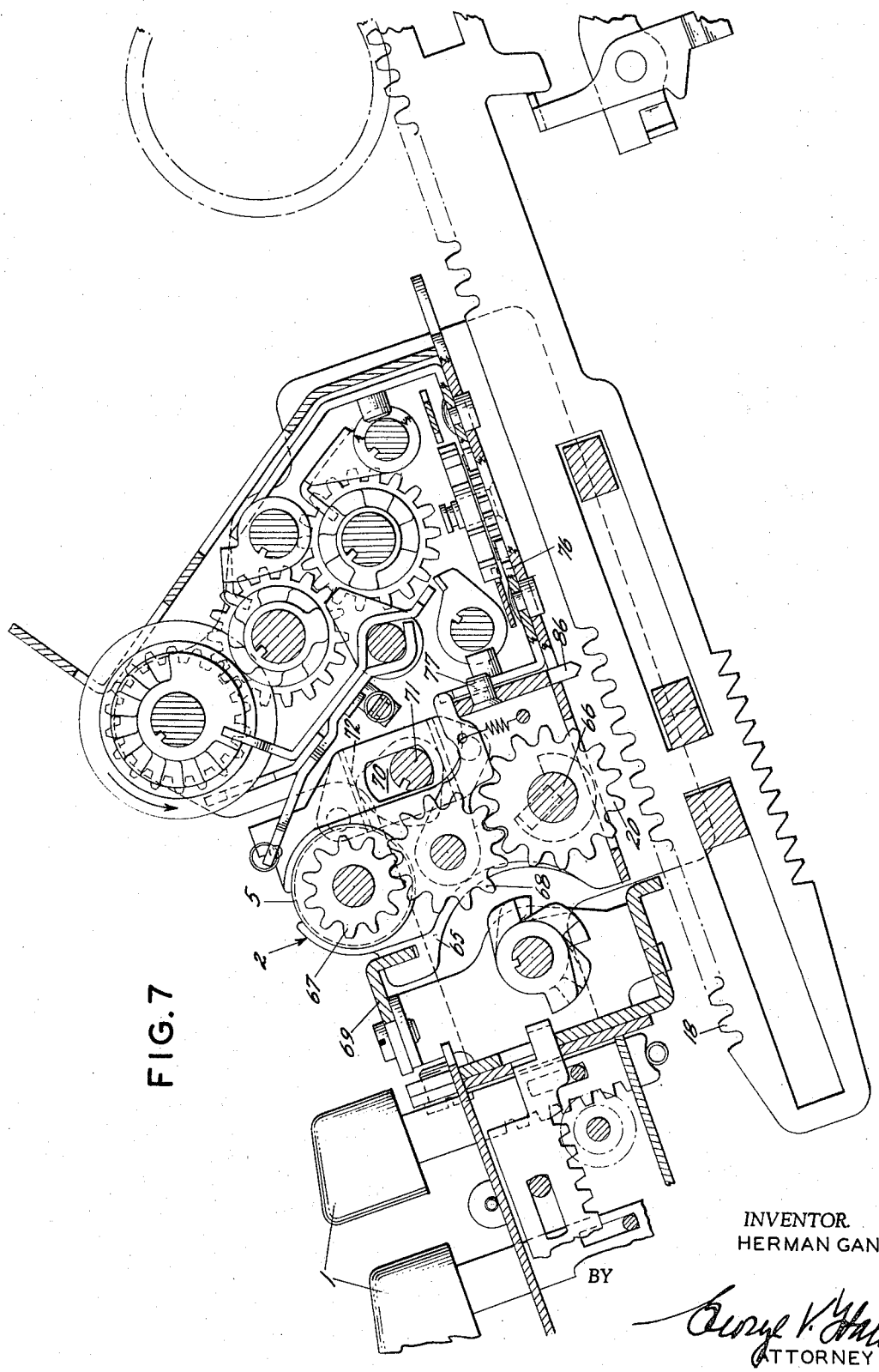
FIG. 7 is a right side fragmentary section of the selector carriage and the front actuator racks.
Figure 8:
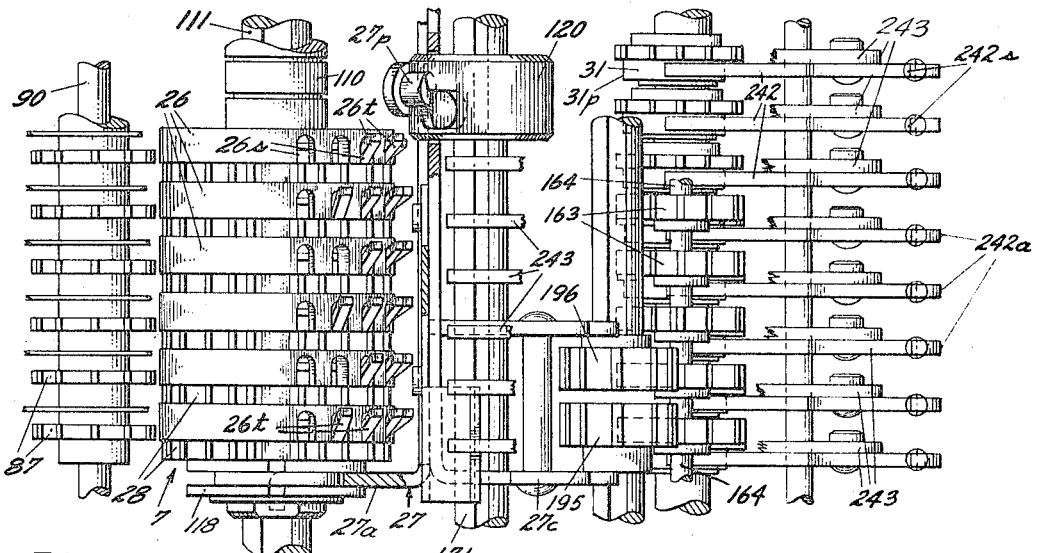
FIG. 8 is a top plan view of a series of the rotary digital actuators, the multiplier storage register and associated multiplication control devices.

Selector carriage 2 (FIGS. 1a, 5, 7) includes a pair of end plates 65 between which selector gears 20 are mounted on a shaft 66. Numeral wheels 5 which display the values set in selector gears 20 are entrained with the selector gears by wheel gears 67 and intermediate gears 68.

Carriage 2 is ordinally shiftable with respect to actuator racks 18 transversely of the machine and is vertically adjustable from a normal raised position to a lowered position wherein set selector gears 20 are engaged with ordinally aligned racks 18.

To permit ordinal shifting and vertical adjustment, carriage 2 is guided adjacent its front by a transverse fixed rail 69 and is supported adjacent its rear by a pair of like cams 70 which are splined on a transverse shaft 71 fulcrumed in the machine framing and extending exteriorly of the right side frame.

Rail 69 has a downwardly turned lip which engages an opened end vertical slot at the front upper edge of each end plate 65 of carriage 2. Accordingly, carriage 2 is guided by rail 69 in transverse shifting movement and is permitted vertical adjustment with respect to the rail and racks 18 by the opened end slots in plates 65 of the carriage.

Cams 70 are trapped in cages 72 secured to the respective end plates 65 of carriage 2. Normally the high parts of the cams engage the tops of the cages and the low parts engage the bottoms; and therefore carriage 2 is held raised with selector gears 20 above racks 18. When carriage 2 is shifted transversely, cams 70, which support the carriage, are slid along shaft 71 to which they are splined. As later described, shaft 71 and cams 70 are rocked counterclockwise to lower carriage 2 to engage set selector gears 20 with ordinally aligned racks 18.

As previously noted, when carriage 2 is in right home position, the highest order selector gear 20 is one ordinal position to the right of the lowest order rack 18. Furthermore, the highest order intermediate gear 68 is in the plane of a mutilated setting gear 75.

Upon depression of each digit key 1, means is operable to engage selection clutch 47 (FIG. 6) for a single cycle of operation. Means operable by the clutch during its cycle will rock setting gear 75, a number of degrees determined by control means which is set upon depression of the digit key, to enter a value into the related selector gear 20 corresponding to the value of the depressed key. Furthermore, the clutch, subsequent to the value entering operation, will operate a carriage escapement 73 to shift the carriage one ordinal position to the left. Accordingly, upon successive depression of digit keys 1, values will be set into selector gears 20 from higher to lower orders and the gears will be shifted into controlling position with respect to racks 18 from lower to higher orders.

Reference is made to applicant's Patent 3,044,697 for a complete disclosure of the means for controlling operation of selection clutch 47 and of the means for setting selector gears 20. Furthermore reference is made to applicant's copending application Ser. No. 222,144 for a complete disclosure of the escapement means 73 for shifting carriage 2 and of means for returning the carriage to home position upon operation of main clutch 41.

The carriage escapement means includes a rack 76 transversely slidable in the machine framing and which is secured to the rear of carriage 2 as described in said copending application. The means for securing the rack and carriage permits the aforenoted vertical adjustment of the carriage with respect to the rack.

The securing means comprises a pair of pins 77 extending from the rear of the carriage. The leftmost pin engages a vertical slot (not shown) in a vertical extension of rack 76, whereas the rightmost pin engages the right end of the extension. Consequently the carriage is shifted transversely with rack 76, yet may be adjusted vertically with respect thereto. Means is selectively operable to vertically adjust carriage 2 to lowered position, upon operation of main clutch 41, during the initial dwell of racks 18 to engage the set selector gears 20 with the related racks prior to their forward strokes.

The means for vertically adjusting carriage 2 includes a pinion 78 (FIG. 19) fixed on the right end of shaft 71 on which cams 70 (FIG. 7) are splined. Pinion 78 is engaged by the front end of a rack arm 79 which is pivotally attached at its rear to an upstanding arm of a lever 80. Normally lever 80 is held counterclockwise against a limit stop by a spring thereby holding rack arm 79 forwardly and gear 78, shaft 71, and cams 70 clockwise. The clockwise position of cams 70 holds carriage 2 raised as previously described.

The end of lower arm of lever 80 is adapted for engagement by an interponent comprising a forwardly extending finger 81 pivotally mounted at its rear on a slide 82. Slide 81 is mounted for front and rear movement on a pair of fixed pins engaging longitudinal slots in the slide.

The front end of slide 82 is pivotally connected to a depending arm of a cam follower 83 which is spring biased counterclockwise to normally engage the low part of a cam 84 fast on main drive shaft 42 and hold said slide toward the rear of the machine. Upon each cycle of main clutch 41, follower 83 will be rocked clockwise by cam 84 and then spring restored thereby reciprocating slide 82 in a forward and a return stroke. The forward stroke of slide 82 occurs during the initial dwell before the forward strokes of racks 18, and the return stroke of the slide occurs during the mid-cycle dwell before the return strokes of the racks.

Normally finger 81 is spring held counterclockwise with its front end below the end of the depending arm of lever 80 and therefore will pass idly beneath said depending arm during the forward stroke of slide 82. However, in response to depression of multiplicand entry key 14 or multiplier entry key 15, program means (later described) operable by main clutch 41 prior to the forward stroke of slide 82 will rock a bail 85 counterclockwise to raise and hold the front end of finger 81 in position to engage the depending arm of lever 80 during the forward stroke of the slide. As a result, lever 80 will be rocked clockwise thereby moving rack arm 79 rearwardly and rotating pinion 78, shaft 71, and cams 70 counterclockwise to lower carriage 2 and engage selector gears 20 with the related actuator racks 18.

Racks 18 will be arrested in their forward strokes when the respective selector gears 20 with which they are engaged are rotated counterclockwise to "0" registering position. For this purpose, each gear 20 is provided with a shoulder which engages a radially extending pin in shaft 66 to arrest rotation of the gear when it is rotated to "0" position.

A depending blade 86 (FIGS. 1a, 7) extends toward the left from selector carriage 2. When carriage 2 is lowered, blade 86 engages suitable teeth in the top edges of those racks 18 which are to the left out of the range of control of selector gears 20. Therefore when the racks are released for forward excursions by restore bail 60, those racks engaged by blade 86 will be held in "0" position.

During the mid-cycle dwell of racks 18, the printing mechanism will be operated. After the printing operation and before the racks are restored, cam 84 will permit follower 83 and the connected parts to be restored thereby raising carriage 2 and disengaging selector gears 20 from racks 18.

*The product register*

Product register 6 (FIGS. 1b, 8, 9, 13) as previously noted, comprises an ordinal series of twenty-one numeral wheels 25. Each wheel 25 includes a wheel gear 25g which is engaged by an intermediate drive gear 87. Suitable yieldable detent means 88 engage gears 25g to locate wheels 25 in their respective registering positions.

Register wheels 25 and intermediate gears 87 are rotatably mounted respectively on shafts 89 and 90 which are supported at their ends in a pair of end plates 91 (FIGS. 1b, 10). Suitable partition plates 92 separate and space wheels 25 and the associated parts and further support shafts 89, 90. Shafts 93, 94, 95 extend through end plates 91 and partition plates 92 thereby aligning and tying these plates together as a unit.

The unit comprising plates 91, 92 and which includes product register 6 is mounted for vertical adjustment in the machine framing to engage and disengage register wheel gears 25g with rear racks 23. To this end, shaft 93 which connects plates 91, 92 adjacent their upper ends extends outwardly from end plates 91 with its respective ends engaging a pair of vertical slots 96 in plates 97 of the right and left machine framing. Each end plate 91 includes a depending leg having a slot 99 at its end engaging a pin 98 extending inwardly from the adjacent frame plate 97. Furthermore, a shaft 100 fulcrumed in plates 97 extends through like vertical slots 101 located between tie shafts 93, 94 in plates 91, 92. Accordingly, the unit comprising plates 91, 92 and including register 6 is mounted for vertical movement by shaft 93 engaging slots 96, slots 99 engaging pins 98, and slots 101 engaging shaft 100.

Normally unit 91, 92 including wheels 25 is held raised with wheel gears 25g of wheels 25 above and disengaged from the respective racks 23. To this end, a pair of like cams 102 are fast on shaft 100 adjacent the outer faces respectively of end plates 91. Each cam 102 is engaged by a pair of vertically spaced rollers 103 mounted on the associated end plate 91. Thus when shaft 100 and cams 102 are in normal clockwise position, unit 91, 92 including wheels 25 will be held raised, and when shaft 100 and cams 102 are rotated counterclockwise the unit will be lowered to engage wheel gears 25g with racks 23.

Means for rotating shaft 100 includes a pinion 104 (FIGS. 18, 19) fast on said shaft exteriorly of the right frame plate 97. Pinion 104 is engaged by a segmental rack 105r carried at the upper end of a vertically disposed lever 105. Lever 105 normally is spring held counterclockwise against a limit stop thereby holding pinion 104, shaft 100 and cams 102 clockwise, and register 6 raised with wheel gears 25g disengaged from racks 23.

The lower end of lever 105 is adapted for engagement by an interponent comprising a rearwardly extending hook arm 107 pivotally mounted at its front on previously described slide 82. Normally hook arm 107 is spring held clockwise with its hook end below the lower end of lever 105 and therefore will pass idly beneath said lever during the forward stroke of slide 82. However, in an operation to take a total (later described) from product register 6, the aforenoted program means operable by main clutch 41 prior to the forward stroke of slide 82 will rock a bail 108 counterclockwise to raise and hold the rear end of hook arm 107 in position to engage the lower end of lever 105 during the forward stroke of the slide. As a result, lever 105 will be rocked clockwise thereby rotating pinion 104, shaft 100 and cams 102 counterclockwise to lower product register 6 to engage gears 25g of wheels 25 with racks 23.

Racks 23 and connected racks 18 will be arrested in their forward strokes when the respective wheels 25 are rotated counterclockwise to "0" registering position. For this purpose, each wheel 25 is provided with a carry tooth 25t (FIGS. 1b. 9) which is adapted for engagement with a nose of a lever 109 which is normally spring held counterclockwise with said nose in the path of said carry tooth.

When a wheel 25 passes from "9" to "0" in a registering operation, tooth 25t will engage the nose to the related lever 109 and rock said lever clockwise to condition tens transfer mechanism, with which the invention is not concerned, for a primary transfer operation. However, when a wheel 25 is rotated counterclockwise in a total taking zeroizing operation, said wheel will be arersted in "0" position by engagement of its carry tooth with the nose of the related lever 109 which nose is shaped to prevent camming operation.

After the printing operation and before the racks are restored, slide 82 will be restored, as previously described, and therefore register 6 will be raised to normal position.

The rotary digital actuators

Rotary digital actuators 26 and 26c of actuator unit 7 (FIGS. 1b, 8, 9, 11, 12, 13, 15) are secured in spaced relationship on a sleeve 110 which is splined for shifting movement on a transverse shaft 111 and for rotation therewith. Shaft 111 is supported transversely of the machine by means for raising and lowering said shaft from a normal intermediate position, and is rotationally driven when in intermediate position by registration clutch 55 as later described.

Each digital actuator 26 includes a cylindrical body portion and nine settable teeth 26t corresponding respectively to the digits "1"–"9." Teeth 26t are contained in radial circumferentially spaced slots 26s (FIGS. 9, 13) in the body portion of the actuator, and each is pivotally mounted at its inner end so that its projecting outer end may be moved to and from left and right vertical planes normal to the rotational axis of the actuator unit.

Actuator unit 7 is coupled to carriage 27 which is operable to shift said unit ordinally with respect to gears 87 of the product register as later described. Actuator unit 7 is normally in a right end ordinally shifted position (FIGS. 11, 12) wherein actuators 26, 26c from lowest to higher orders are operatively associated for additive registration with intermediate gears 87 respectively of product register 6 from lowest to higher orders. As later described, the actuator unit is adjustable a short step to the right from its normal position with respect to the carriage to provide for subtractive registration by complemental addition.

Figure 13:
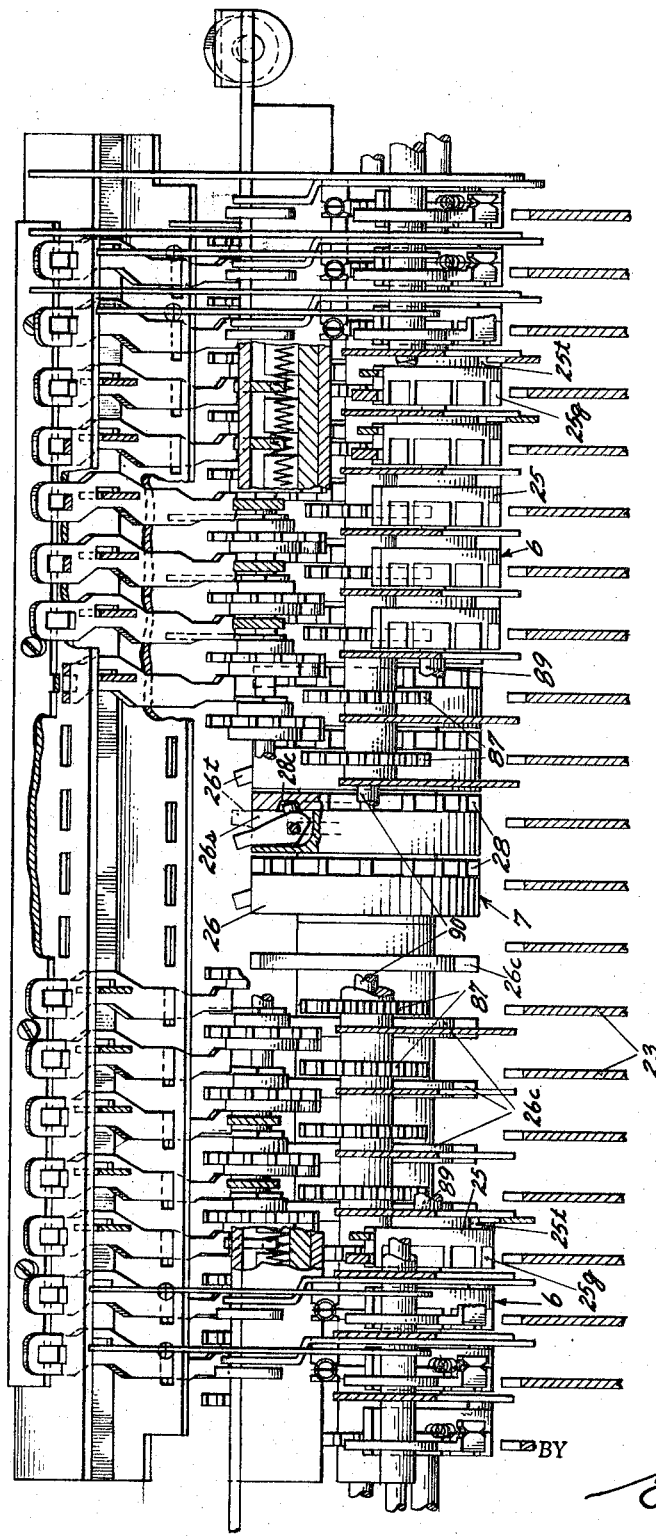
FIG. 13 is a front elevation of the rotary digital actuators and the product register with parts broken away.

When an actuator 26 is set for "0" registering operation, teeth 26t are in the aforenoted left vertical plane wherein they are a short distance to the left from the plane of the associated intermediate gear 87 as shown in FIG. 13. When one or more of the nine teeth are set to the aforenoted right vertical plane, they are located in the plane of gear 87 and are therefore effective for additive registration in accordance with the number of teeth set by clockwise rotation (FIGS. 1b, 9) of the actuator unit. It will be noted that the number of teeth 26t remaining in the left plane is the nines complement in all but the lowest order actuator which includes ten teeth; one of which is fixedly located in the left plane. This provides for the tens complement in the units order which is necessary for subtractive registration of a number by addition of the complement.

To provide for subtractive registration by addition of the complement, actuator unit 7 is adjusted the aforenoted right step of movement with respect to carriage 27. This will bring teeth 26t comprising the complement into the planes of the respective associated gears 87. Furthermore, nine toothed complemental actuators 26c which are normally in planes to the left of the associated gears 87 will be moved into the planes of those gears.

Means for setting teeth 26t of each actuator 26 includes a setting gear 28 rotatable on sleeve 110 to the right of and engaging the left face of the actuator. Gear 28 is provided with an arcuate cam slot 28c (FIGS. 9, 13) in its face adjacent the actuator and this cam slot is engaged by projections which extend toward the right from the base of each tooth 26t.

Figure 12:
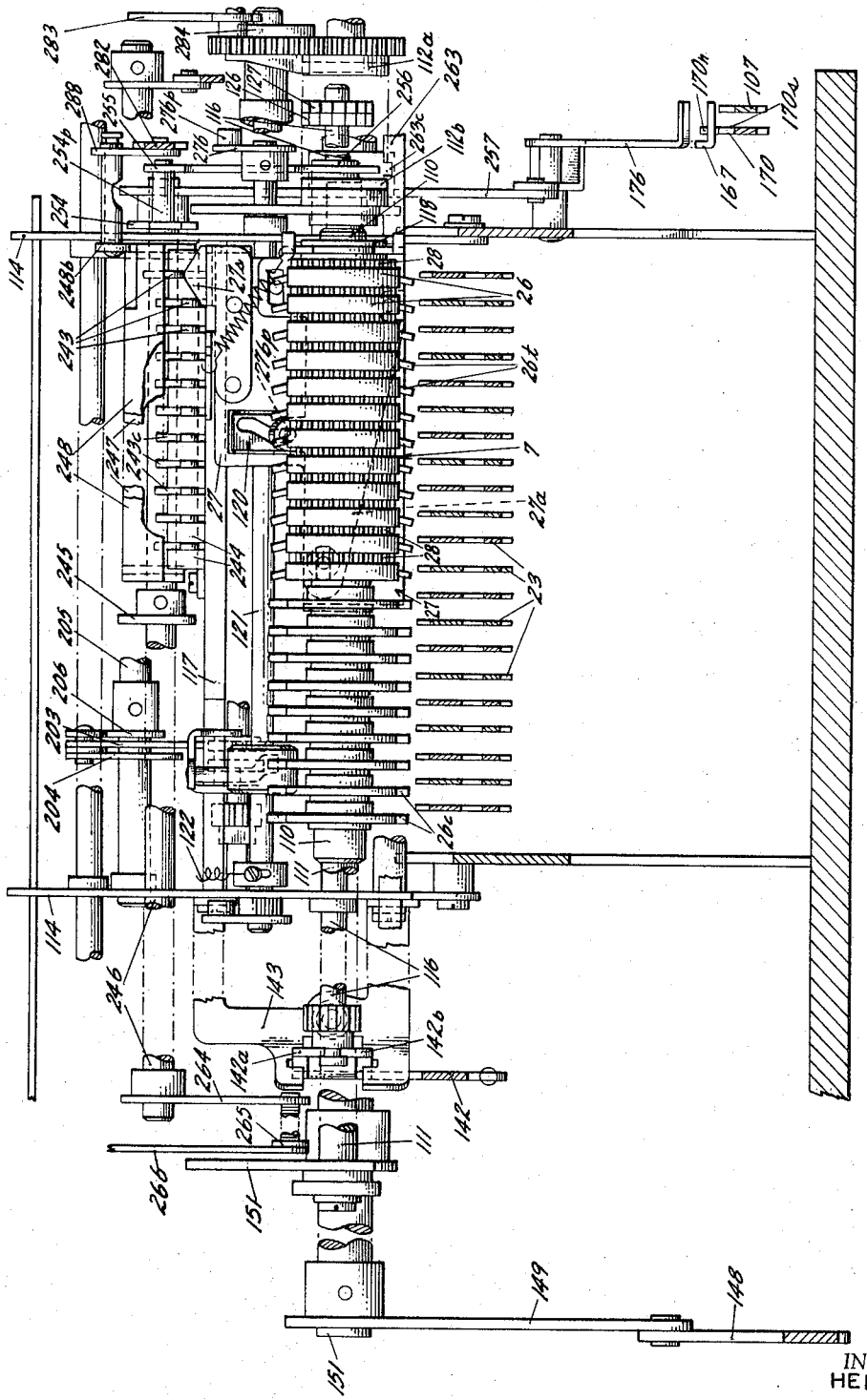
FIG. 12 is a front elevation of the rotary digital actuators and associated control devices.

When gear 28 is in normal counterclockwise position, teeth 26t will be held rocked by cam slot 28c with their ends in the plane to the left of the associated intermediate gear 87 as shown in FIGS. 12. 13. Upon clockwise movement of gear 28, teeth 26t will be rocked successively by cam slot 28c to the plane of gear 87. A spring pressed ball detent 29 in the body of the actuator engages a tooth space of gear 28 to hold it in adjusted position.

Teeth 26t of actuators 26 extend through an arc of somewhat less than 180°. This provides for an idle phase of operation at the beginning of each cycle before teeth 26t are rotated to engagement with intermediate gears 87, and for an idle phase at the end of the cycle after digital registration during which tens transfer mechanism 8 is effective. During the first idle phase means, later described, is operable to effect the aforenoted adjustment of actuator unit 7 with respect to carriage 27 for complemental registration and vice versa. The invention is not concerned with the operation of the tens transfer mechanism as previously noted.

Means for unidirectionally driving actuator 7 by registration clutch 55 includes a coupling 112 (FIGS. 11, 12, 18) between the clutch and shaft 111 on which the unit is shiftably splined. Coupling 112 includes a driving member 112a fast on the output shaft of clutch 55 and a driven member 112b fast on shaft 111. Member 112a includes a diametral slot which is vertically disposed when clutch 55 is in full cycle position and member 112b includes a diametral tongue which engages said slot Accordingly unit 7, while in the aforenoted intermediate position, is driven by clutch 55, and when the parts are at rest in full cycle position, the vertically disposed slot and tongue of coupling 112 will permit unit 7 to be raised for zeroizing actuators 26 and lowered to enter a value therein as later described.

The carriage for the digital actuators

Carriage 27 (FIGS. 1b, 9, 11, 12) comprises a vertically disposed plate extending transversely of the machine and having rearwardly turned end portions by which said carriage is slidably supported for transverse shifting movement between a pair of left and right frame plates 114 on a transverse shaft 116 which is journaled in said plates. Furthermore, shaft 116 is longitudinally shiftable, as later described, a short step of movement toward the left from a normal position. Additional means for slidable supporting carriage 27 comprises a transverse square shaft 117 secured at its ends in plates 114 and engaged by an open end recess at the top of the right rear extension of the carriage.

Means for coupling actuator unit 7 for shifting movement with carriage 27 includes a plate 27a which is mounted on the front face of the carriage by slot and pin connections which permit said plate to be adjusted a short distance right and left on said carriage.

The right end of plate 27a has a forwardly turned end portion having a vertical front edge which engages a circumferential slot in a collar 118 fast on sleeve 110 adjacent the lowest order setting gear 28 of actuator unit 7. Accordingly actuator unit 7 is coupled to carriage 27 by plate 27a and collar 118.

Means normally operable to hold plate 27a and coupled actuator unit 7 in a left adjusted position with respect to carriage 27 includes a cylindrical cam 120 splined for shifting movement on a shaft 121 which is journaled in frame plates 114 to the rear of carriage 27. The front of cam 120 passes snugly through an opening in carriage 27 and therefore is shifted with the carriage. A pin 27p projecting rearwardly from an ear at the top edge of plate 27a engages a cam slot in cam 120. Normally shaft 121 and cam 120 splined thereon are held clockwise (FIG. 9) by a spring 122 with the cam slot engaging pin 27p operable to hold plate 27a in left adjusted position on carriage 27. Means, later described, is operable to rotate shaft 121 and cam 120 a counterclockwise step to move plate 27a to the aforenoted right adjusted position on carriage 27. This will adjust actuator unit 7 for complemental registration as previously described.

Shifting means for the digital actuator carriage

Means for ordinally shifting carriage 27 and actuator unit 7 comprises a worm gear 123 (FIGS. 9, 11, 25) fast on shaft 116 and engaging a rack 27r secured at the lower rear of said carriage. Clockwise rotation of gear 123 will shift carriage 27 toward the left from right home position and counterclockwise rotation will restore said carriage.

Each ordinal shift of carriage 27 is effected by a 60° rotation of gear 123 and detent means is operable to locate carriage 27 in any ordinal shifted position. The detent means comprises a toothed wheel 124 (FIG. 15) fast adjacent the left end of shaft 116 and a spring pressed ball 125 engaging the space between a pair of adjacent teeth of wheel 124.

Means for rotating shaft 116 and worm 123 upon operation of shift clutch 53 (FIGS. 14, 25) includes a pair of ratchet wheels 126, 127 abutting one another and fast adjacent the right end of shaft 116. Each ratchet wheel has six teeth and wheel 126 is adapted to impart counterclockwise right shift rotation to shaft 116 whereas wheel 127 is adapted to impart clockwise left shift rotation.

A right shift pawl arm 128 and a left shift pawl arm 129 are adapted respectively to operate ratchet wheels 126, 127. Pawls 128, 129 have common pivotal mounting at the lower end of a lever 130 which is loosely mounted on a sleeve 131s which is rotatably mounted on a short shaft 131 fixed in the machine framing. An arm 132 is fast on sleeve 131s adjacent lever 130 and is connected at its upper end to the upper end of said lever. Lever 130 therefore is yieldably connected for rocking movement with arm 132 fast on sleeve 131s.

A lever 133 is fast on sleeve 131s inwardly of lever 130 and arm 132. A forwardly extending strap 134 is pivotally attached at its rear to arm 133, and at its front, the strap encircles an eccentric 135 fixed for rotation with the driven member of shift clutch 53. Therefore upon each cycle of clutch 53, strap 134 will be moved forwardly and restored thereby rocking arm 133, sleeve 131s, arm 132 and lever 130 in counterclockwise and return clockwise movement. This operation during each clutch cycle will reciprocate pawls 128, 129 toward the rear and then forwardly in an operating stroke.

The front operating end of pawl 128 is located above in the plane of ratchet wheel 126 and the front end of pawl 129 is below in the plane of wheel 127. Pawl 128, intermediate its ends, engages an upper guide slot in a vertical slide 136 (FIGS. 14, 21–23, 25) and pawl 129 engages a lower guide slot in said slide. A spring connects pawls 128, 129 and therefore pawl 128 is held counterclockwise in engagement with the bottom of its slot and pawl 129 is held clockwise in engagement with the top of its slot.

Figure 14:
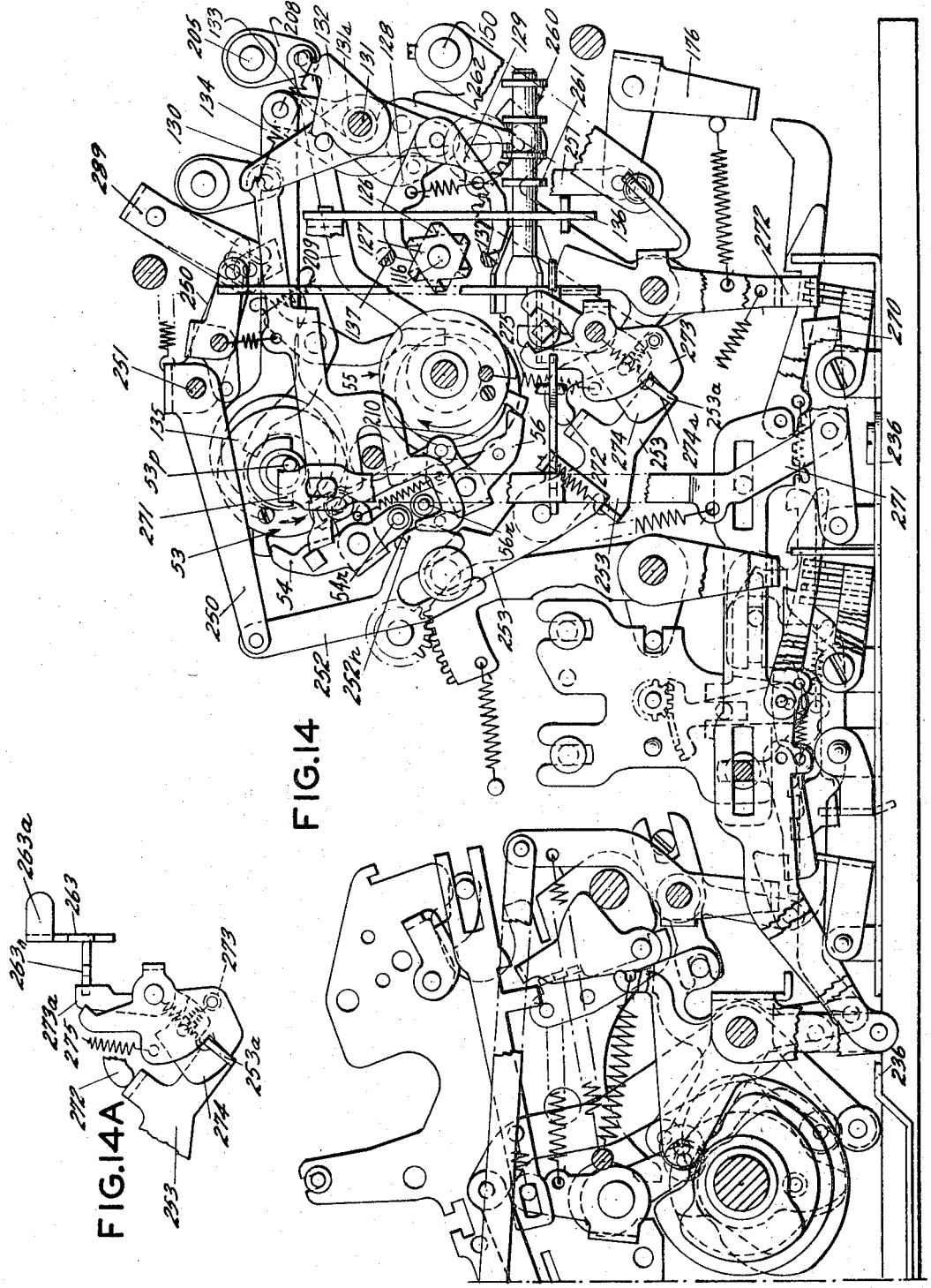
FIG. 14 is a right side elevation of the registration and shift clutches, and associated mechanism.

Normally slide 136, which is adapted to be adjusted to a raised or lowered position, is held in the lowered position by a toggle spring 136s. With slide 136 in lowered position, the operating end of pawl 128 will engage ratchet wheel 126 and the operating end of pawl 129 will be below and disengaged from wheel 127 (FIG. 14). Therefore in each clutch cycle during the rearward stroke of pawls 128, 129; pawl 128 will rack idly over a tooth of ratchet wheel 126 and on the forward stroke will engage said tooth and rotate said wheel 60° counterclockwise to effect one ordinal right shift operation. During this operation, pawl 129 will operate idly out of engagement with ratchet wheel 127.

With slide 136 in raised position where it is held by the above noted toggle spring 136s, the operating end of pawl 129 will engage ratchet wheel 127 and the operating end of pawl 128 will be above and disengaged from wheel 126. Therefore in each clutch cycle during the rearward stroke of pawls 128, 129; pawl 129 will rack idly over a tooth of wheel 127 and on the forward stroke will engage said tooth and rotate said wheel 60° clockwise to effect one ordinal left shift operation. During this operation pawl 128 will operate idly out of engagement with ratchet wheel 126.

A pair of guide pins 137 are provided to insure unfailing operation of pawls 128, 129. During the effective operating movement of pawl 128 or 129, a pin 137 will engage the pawl and hold it against disengagement from the associated ratchet wheel.

Shift clutch 53 and shift direction control slide 136 are controlled in a program of multiplication as later described.

*The clearing means and the value entering means for the rotary digital actuators*

During a cycle of main clutch 41 (FIG. 3), auxiliary clutch 45 (FIGS. 3A, 16) is operable in connection with means for clearing differentially settable digital actuators 26 of unit 7 (FIGS. 1b, 8, 9, 13) and with means for entering a new value in said actuators. The clearing operation is effected by a series of pinions 140 associated respectively with setting gears 28 of actuators 26, and the value entering operation is effected by operation of actuator racks 23 under control of selector carriage 2.

Clearing pinions 140 are fast on a shaft 141 rotatably mounted in the machine framing above and extending longitudinally of actuator unit 7. Pinions 140 are in the vertical plane of the ordinally corresponding racks 23, and the ordinally corresponding setting gears 28 of actuators 26 are normally a short distance to the right from the planes of the racks and pinions. This displacement of setting gears 28 is caused by the location of product register gears 25g and intermediate gears 87 in the planes of racks 23 and by the location of the right plane additive setting of actuator teeth 26t in the planes of gears 87. Therefore to effect a clearing and value entering operation, actuator unit 7 must be shifted a step of movement toward the left to bring setting gears 28 into the planes of the ordinally corresponding racks 23 and pinions 140. Then unit 7 will be raised to engage gears 28 with pinions 140 for the clearing operation. After this the unit 7 will be lowered to engage gears 28 with racks 23 for the value entering operation. Finally unit 7 will be raised to intermediate position between racks 23 and pinions 140, and restored a step of movement to the right.

The means for shifting actuator unit 7 toward the left includes a cam slide 142 (FIGS. 11, 16, 17) extending from front to rear and having a forwardly turned rear end with a longitudinal opened end slot 142s engaging a circumferential groove adjacent the left end of shaft 116 which carries worm gear 123 for ordinally shifting carriage 27 of actuator unit 7. Shaft 116, as previously noted, is longitudinally shiftable. An upper leg 142a and a lower leg 142b define slot 142s of slide 142, and the upper and lower edges of the legs respectively are inclined toward the left as extending toward the rear from the rear of slot 142s.

A bracket 143 secured to the machine framing includes an upper leg 143a extending to the left above leg 142a of slide 142, and a lower leg 143b extending beneath lower leg 142b of the slide. With slide 142 in normal forward position, a slot in the lower edge of leg 143a engages the rear of the upper inclined edge of leg 142a, and a slot in the upper edge of leg 143b engages the rear of the lower inclined edge of leg 142b.

With the parts in the above normal position, the rear end of slide 142, shaft 116 and worm gear 123 will be held in a right adjusted position. This will locate carriage 27 and actuator unit 7 in a right adjusted position wherein setting gears 28 are displaced to the right of the planes of the related clearing pinions 140 and racks 23. Rearward movement of slide 142 will move the inclined edges of legs 142a and 142b in the slots of bracket 143 thereby moving the rear of slide 142 and the connected parts to a left adjusted position to locate setting gears 28 in the planes of the related pinions 140 and racks 23.

Means for moving slide 142 during a cycle of auxiliary clutch 45 includes a cam 144 of a cluster driven by said clutch. A follower 145 fulcrumed on a shaft 146 engages cam 144 and has an upstanding arm which has pivotal connection with the front end of slide 142. Spring means urges slide 142 forwardly and follower 145 counterclockwise into engagement with cam 144.

At the start of a cycle of clutch 45, cam 144 will rock follower 145 clockwise thereby moving slide 142 rearwardly to adjust actuator unit 7 to the left to locate setting gears 28 in the planes of pinions 140 as previously described, and the parts will not be restored until near the end of the clutch cycle. Immediately subsequent to this operation, means operable by clutch 45 will raise actuator unit 7 to engage setting gears 28 with clearing pinions 140.

The means for raising actuator unit 7 includes a cam 152 of the cluster of clutch 45. A cam follower 147 is fulcrumed on shaft 146 adjacent follower 145 and engages cam 152. A depending arm of follower 147 has pivotal connection with the front of a link 148 which at its rear is pivotally connected to the end of a depending arm 149 which at its top is fast on the left end of a cross shaft 150 fulcrumed in the machine side frames.

A pair of right and left forwardly extending arms 151 (FIGS. 11, 12, 16) are fast at their rear on shaft 150; and at their front ends, the arms are provided with suitable bearings for rotatably supporting shaft 111 on which actuator unit 7 is splined. Spring means biases arms 151 in downward counterclockwise direction. Link 148 therefore will be urged toward the rear by arm 149, thereby holding follower 147 counterclockwise in engagement with cam 152.

Cam 152 includes a high, low and intermediate part. Normally follower 147 engages the intermediate part, and therefore actuator unit 7 is held in an intermediate position between clearing pinions 140 and racks 123. Immediately after operation of clutch 45 to adjust actuator unit 7 to the left to bring setting gears 28 in the planes of pinions 140 and racks 23, the high part of cam 152 will engage and rock follower 147 clockwise. This will move link 148 forwardly thereby raising arms 151 and actuator unit 7 to engage setting gears 28 with clearing pinions 140. Setting gears 28 will remain engaged with pinions 140 while said pinions are rotated clockwise to zeroize actuators 26.

It will be recalled that coupling 112 (FIGS. 11, 12) will permit actuator unit 7 to be raised and lowered from intermediate position when registration clutch 55 is in normal disengaged position, and that the vertical edge of the right end portion of plate 27a of carriage 27 engaging the circumferential slot of collar 118, will permit unit 7 to be raised and lowered with respect to said carriage. When the unit is raised or lowered, a lower or an upper rightwardly turned ear of the end portion of plate 27a will engage a respective lower or upper notch in the edge of collar 118 to secure actuator unit 7 from any slight rotary movement which may be permitted by partially disengaged coupling 112.

Means for rotating clearing pinions 140 clockwise in a zeroizing operation for actuators 26 includes a drive pinion 153 (FIGS. 15, 16) fast adjacent the left end of shaft 141 on which pinions 140 are fast. A rack 154 has teeth along its upper edge engaging drive pinion 153 and extends forwardly where it has pivotal connection with an upstanding arm of a follower 155 which engages a cam 156 of the cluster driven by clutch 45. Spring means biases rack 154 rearwardly and follower 155 clockwise in engagement with cam 156.

While setting gears 28 are held engaged with clearing gears 140, cam 156 will rock follower 155 counterclockwise thereby moving rack 154 forwardly to rotate drive pinion 153 and clearing pinions 140 clockwise and setting gears 28 counterclockwise to zeroize actuators 26 as previously described. When each gear 28 is rotated to zero setting position, the related pinion 140 will engage a mutilated area of said gear 28 wherein a tooth is missing and therefore further rotation of pinion 140 will be ineffective.

The above operations are performed by auxiliary clutch 45 during the first half of the clutch cycle and during which time actuator racks 23 have completed their forward strokes by the simultaneous operation of main clutch 41. Near the end of said first half cycle, and after the clearing operation and the completion of the forward strokes of racks 23, the low part of cam 152 will engage follower 147 which will therefore be rocked counterclockwise to move link 148 rearwardly lowering arms 151 and unit 7 to engage setting gears 28 with racks 23. This engagement will be maintained during the return strokes of racks 23 which occur during the last half clutch cycle, and therefore values set in selector carriage 2 will be entered in actuators 26.

Near the end of the clutch cycle after the return strokes of racks 23, actuator unit 7 will be restored to its normal intermediate and right adjusted positions. Furthermore, during the last half clutch cycle clearing pinions 140 and the operating train will be restored.

*The multiplier quotient register*

Multiplier quotient register 9 (FIGS. 1b, 9, 11) as previously noted, comprises an ordinal series of eleven storage gears 30. These gears are located in the planes of and are normally disengaged above the ordinally corresponding lowest order racks 23. The ten lowest order racks 23 are operable to enter ten multiplier digits in the ten lowest order gears 30; the eleventh order gear 30 being provided to receive a shortcut multiplier digit "1" as later described.

Each gear 30 includes ten teeth corresponding to the digits "0"–"9"; and integral with each gear at the right thereof is a control cam 31 the edge of which has a zero part 31z, a plus part 31p, and a minus part 31m. The zero part 31z is of the greatest height and extends peripherally between the "1," "9" digit teeth of the gear in transverse alignment with the "0" tooth. The plus part 31p is of intermediate height and extends counterclockwise from part 31z the extent of five teeth in transverse peripheral alignment with the "1"–"5" digit teeth. And the minus part 31m is of least height and extends between parts 31p, 31z the extent of four teeth in peripheral transverse alignment with the "6"–"9" digit teeth. Cams 31 are operable, as later described, in connection with the control of short cutting when a multiplier digit is greater than "5."

Figure 15:
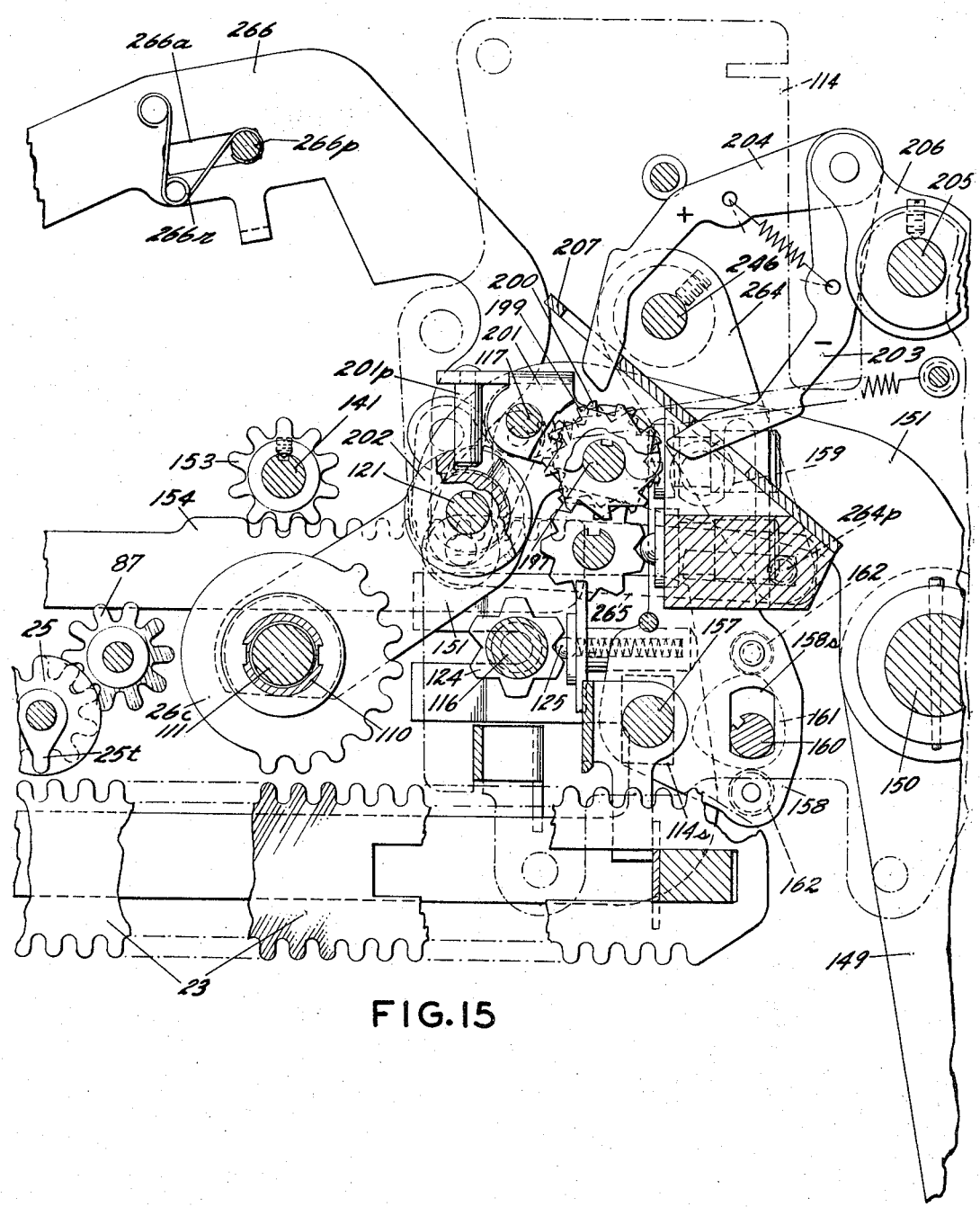
FIG. 15 is a vertical section showing the counting means for the multiplier storage register and parts of the total taking control means.

Storage gears 30 with their cams 31 are rotatably mounted on a shaft 157 which is supported at its ends in a pair of end plates 158 (FIGS. 15, 18). The register unit 9 comprising plates 158, shaft 157, and gears 30 with cams 31 is supported for vertical adjustment on the pair of right and left frame plates 114 as follows.

End plates 158 are respectively located on the outer faces of frame plates 114 and each is provided with a vertical guide slot at its upper end which is engaged by the shank of a screw 159 threaded in the related plate 114. The ends of shaft 157 pass respectively through vertical guide slots 114s in frame plates 114 to a position adjacent the lower ends of plates 158 where the ends of the shaft are secured. A cam shaft 160 is rotatably mounted in frame plates 114 and its respective ends extend through vertical guide slots 158s in end plates 158 rearwardly of shaft 157.

The above arrangement of guide slots permits vertical adjustment of register unit 9 by a pair of like cams 161 mounted on shaft 160. One cam 161 is fast on shaft 160 adjacent the outer face of the left end plate 158 of the unit and the other cam 161 is fast on said shaft adjacent the outer face of the right end plate 158. A pair of vertically spaced rollers 162 on the outer face of each end plate 158 are engaged by the top and bottom of the related cam 161.

When shaft 160 and cams 161 are in normal clockwise position, cams 161, operating on rollers 162, will hold unit 9 raised with multiplier storage gears 30 engaged with a corresponding series of intermediate gears 163 (FIGS. 1b, 9, 11) which are rotatably mounted on a shaft 164 supported at its ends in frame plates 114. Intermediate gears 163 are located by spring urged detents 165 which are pivotally mounted on a transverse shaft 168 supported in frame plates 114, and therefore storage gears 30 engaged with gears 163 will be held in digitally adjusted position.

Upon counterclockwise movement of shaft 160, cams 161 operating on rollers 162, will adjust unit 9 to a lowered position wherein gears 30 will be disengaged from intermediate gears 163 and engaged with actuator rack 23. In the adjusting operation, gears 30 will be moved into part engagement with racks 23 before complete disengagement from gears 163 to insure that gears 30 will retain their settings.

Means for rotating shaft 160 includes a pinion 166 (FIG. 18) fast on said shaft to the right of right cam 161. Pinion 166 is engaged by a segmental rack 167r carried at the upper end of a vertically disposed lever 167. Lever 167 normally is spring held counterclockwise against a limit stop thereby holding pinion 166, shaft 160 and cams 161 clockwise, and register unit 9 raised with register gears 30 disengaged from racks 23 and engaged with intermediate gears 163.

The lower end of lever 167 is adapted for engagement by a shoulder 170s of an interponent comprising a rearwardly extending arm 170 pivotally mounted at its front on the rear of a slide 171. The rear of arm 170 is in the form of a nose 170n for an operation later described. Slide 171 is mounted for front and rear movement immediately inward of previously described slide 82 and has common mounting therewith.

The front end of slide 171 is pivotally connected to a depending arm of a cam follower 172 including a pair of legs engaging respectively positive action cams 173a and 173b fast on main drive shaft 42. Normally follower 172 and slide 171 are held by cams 173a, 173b in an intermediate position with shoulder 170s immediately to the rear of the lower end of lever 167. Upon each cycle of main clutch 41, follower 172 will be rocked clockwise, then counterclockwise beyond said intermediate position, and then clockwise to said intermediate position. Accordingly, slide 171 will be moved forwardly from said normal intermediate position, then rearwardly beyond said intermediate position, and then forwardly to said intermediate position.

The forward stroke of slide 171 occurs during the midcycle dwell after the forward strokes of racks 23 and before their return strokes. During the return strokes of racks 23, slide 171 will be held in forward stroke position; and then restored during a dwell at the end of the cycle.

Normally arm 170 is spring held clockwise with shoulder 170s below the lower end of lever 167; and therefore said shoulder will pass idly beneath said lever during the forward stroke of slide 171. However the aforenoted program means, operable by main clutch 41 in response to depression of multiplier entering key 15 (later described), will rock a bail 174 counterclockwise to raise arm 170 with shoulder 170s in position to engage the lower end of lever 167 during the forward stroke of slide 171. As a result, lever 167 will be rocked clockwise thereby rotating pinion 166, shaft 160 and cams 161 counterclockwise to lower register unit 9 to engage multiplier storage gears 30 with racks 23. Racks 23 therefore in their return excursions will enter a multiplier value set in selector carriage 2 in storage gears 30.

The return stroke of slide 171 beyond normal intermediate position provides for a conditioning operation (later described) which is performed by nose 170n of arm 170.

*The counting means for the multiplier quotient register*

Multplier storage gears 30 of register 9 (FIGS. 1b, 9), from lower to higher orders, are counted successively to zero position in a program of multiplication. If a gear is set for a multiplier digit value of "5" or less, the gear is counted back to "0," and the multiplicand will be added in product register 6 the number of times corresponding to the value of the multiplier digit. However, if the multiplier value is "6" or more, the gear will be counted forwardly to "0" in a shortcut operation, and the multiplicand will be subtracted by complemental addition the number of times corresponding to the tens complement of the multiplier value. Furthermore means is provided to add a digit "1" to the multiplier value in the next higher order gear 30.

The counting means includes a counting gear 194 (FIGS. 9, 11) and an intermediate counting gear 195 driven by the counting gear. Gear 194 is splined for shifting on a transverse shaft 197 which is rotatably mounted in frame plates 114, and gear 195 is loosely mounted for shifting and rotation on a transverse shaft 198 which is also rotatably mounted in frame plates 114. Immediately to the left of intermediate gear 195 and splined for shifting on shaft 198 is a shortcut gear 196.

Gears 194, 195, 196 are trapped in a cage comprising the rearwardly extending right end of carriage 27 and a rearwardly extending plate 27c secured to the rear wall of the carriage. Accordingly, gears 194, 195, 196 will be shifted with carriage 27.

When carriage 27 is in rightmost shifted position, intermediate counting gear 195 will engage intermediate gear 163 of the lowest order multiplier storage gear 30, and shortcut gear 196 will engage the next higher order intermediate gear 163. Therefore as carriage 27 is shifted to the left to ordinarily shift actuator unit 7 with respect to the product register 6, intermediate counting gear 195 and shortcut gear 196 will be ordinally shifted to engage the successive higher order intermediate gears 163 of counter register 9.

Means for counting a multiplier storage gear 30 back (counterclockwise) to "0" and forwardly (clockwise) to "0" includes respectively a pair of ratchet wheels 199, 200 (FIGS. 11, 15) shiftably splined as a unit on shaft 197 on which counting gear 194 is splined. The wheels are in spaced relationship with wheel 199 to the right of wheel 200 on common hub means.

Ratchet wheels 199, 200 are trapped in a cage 201 which is slidably mounted on shaft 117 forwardly of said wheels. Cage 201 includes a front projection on which is a depending pin 201p engaging a cam slot in a cylindrical cam 202 fast on shaft 121. It will be recalled that shaft 121 is normally spring held clockwise and splined thereon is cam 120 operable, upon counterclockwise movement of shaft 121, to adjust actuator unit 7 a step to the right with respect to carriage 27 to provide for complemental registration. Accordingly, upon counterclockwise movement of shaft 121, cam 202 will move cage 201 and wheels 199, 200 a step to the right to move wheel 199 from the plane of a counting finger 203 and wheel 200 into the plane of a counting finger 204.

Finger 203 operates through wheel 199 to count a storage gear 30 back (counterclockwise) to "0" during additive operation of actuator unit 7, whereas finger 204 operates through wheel 200 to count a storage gear 30 forwardly (clockwise) to "0" during subtractive operation of actuator unit 7 by complemental addition. Fingers 203, 204 have common pivotal mounting at their rear at the end of an upstanding arm 206 fast on a transverse shaft 205 which is pivotally mounted adjacent its ends in frame plates 114. Fingers 203, 204 are spring urged one toward the other and extend forwardly through guide slots in a fixed plate 207 with finger 203 normally in the plane of ratchet wheel 199 and finger 204 in a plane between wheels 199, 200.

A depending arm 208 (FIG. 14) is fast adjacent the right-end of shaft 205 and is connected by an eccentric strap 209 to an eccentric 210 driven by registration clutch 55. Therefore upon each cycle of clutch 55, shaft 205 will be rocked counterclockwise and restored thereby moving fingers 203, 204 in forward and/return strokes.

With the parts in normal position, finger 203 in its forward stroke will engage a tooth of wheel 199 thereby rotating shaft 197 a step of movement clockwise. This step of movement will, through counting gear 194, intermediate gear 195 and an intermediate gear 163, step an entrained storage gear 30 one tooth space back toward "0." In this operation, finger 204 will be idly operated between wheels 199, 200.

When wheels 199, 200 are shifted to the right by cam 202 as previously described, wheel 199 will be removed from the plane of finger 203 and wheel 200 will be moved into the plane of finger 204. As a result, shaft 197 will be stepped counterclockwise by finger 204 when clutch 55 is cycled and the entrained storage gear 30 will be stepped forwardly to "0."

Detent means 211 is operable to locate shaft 197 and the entrained parts upon each step of movement. The detent means comprises a toothed wheel fast on shaft 197 to the left of ratchet wheels 199, 200 and a spring pressed ball engaging a space between a pair of adjacent teeth of the toothed wheel.

In a shortcut operation, later described, shaft 198 and gear 196 splined thereon are stepped on position clockwise to enter a multiplier digit "1" in the next higher order storage gear 30 if the adjacent lower order gear 30 contains a multiplier digit of "6" or more. Detent means 212 similar to detent means 211 is operable to locate shaft 198 and gear 196 in adjusted position.

*Multiplication (multiplicand entry)*

Figure 9:
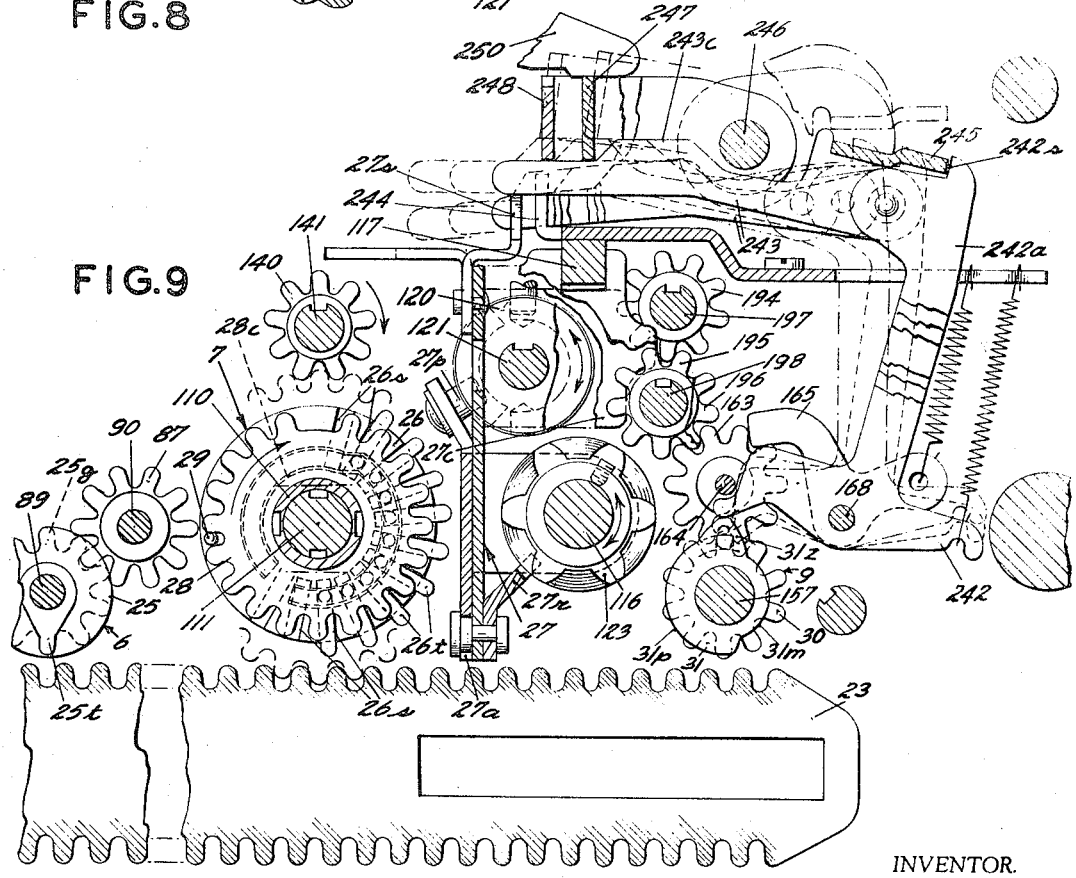
FIG. 9 is a verical section of the mechanism of FIG. 8.

Multiplicand entry key 14 (FIGS. 2, 5) will be depressed after depression of digit keys 1 to enter a multiplicand into selector carriage 2. Depression of key 14 will effect engagement of main clutch 41 (FIG. 3). A hold-up clutch lever 175, however, is operable to interrupt the operation of clutch 41 at 30° in the cycle. During this 30° operation, certain program control devices are set and means is operated to release hold-up lever 175 to permit clutch 41 to complete its cycle to enter the multiplicand into digital actuator 26 of actuator unit 7 (FIGS. 1b, 9).

The interruption of the operation of clutch 41 permits selector carriage 2 to be left shifted to an ordinal position determined by operation of decimal point mechanism before operation of the clutch to enter the value from the carriage to actuators 26. The decimal point mechanism however may be disabled and in such instance the selector carriage will not be shifted during the 30° operation of clutch 41. With the decimal point mechanism disabled, clutch lever 175 will be disabled during the 30° operation of the clutch which will accordingly complete its cycle without interruption. The above and other operations referred to and not described in detail herein are fully disclosed in applicant's aforenoted application S.N. 222,144 to which reference is made.

Depression of any one of the function keys 14–17 is operable to engage main clutch 41. Accordingly depression of multiplicand entry key 14 operates means to move a link 178 rearwardly. Link 178, at its rear has yieldable slot and pin connection with a link 179 which is normally spring held rearwardly with respect to link 178 to the limit of the slot and pin connection. Link 179 extends rearwardly and is there connected to the aforenoted clutch lever 43. A spring 181 attached to link 178 normally holds links 178, 179 forwardly and clutch lever 43 counterclockwise in engagement with pawl 41p to disengage clutch 41. Therefore rearward movement of link 178, upon depression of key 14, will rock clutch lever 43 clockwise to engage the clutch. In the above operation, means is operable to latch key 14 depressed and the clutch engaging parts in operated position.

Clutch lever 175 for interrupting operation of clutch 41 after 30° of operation is fast on a shaft 177 fulcrumed in the machine framing and includes a rearwardly extending arm having a bent over end normally in the path of clutch pawl 41p to disengage said clutch. Means for controlling lever 175 includes a cam follower comprising a lever 183 having common fulcrum with lever 175. Follower 183 comprises a depending arm having a roller at its end normally engaging the high part of a cam 184 shown in dotted lines (FIG. 3) and which has a low part immediately clockwise from the roller. Spring means holds clutch lever 175 counterclockwise with respect to follower 183 in engagement with a limit stop comprising a pin in the follower. Accordingly when follower 183 engages the high part of cam 184, clutch lever 175 will be held counterclockwise to clutch disengaging position in the path of clutch pawl 41p.

When the driven member of clutch 41 moves between full cycle position and the 30° step of rotation, the low part of cam 184 will be brought into registration with the roller of follower 183. Follower 183 will now be free for clockwise movement to thereby rock clutch lever 175 clockwise from the path of pawl 41p to permit clutch 41 to complete its cycle without interruption, or to release pawl 41p to reengage the clutch after interruption. The first of the above operations of clutch lever 175 will be effected if the decimal system is disabled and the second if the system is enabled.

Main clutch 41, during the above noted 30° of operation in response to depression of multiplicand entry key 14, operates means for performing the following operations. Bail 85 (FIGS. 18, 19) will be raised thereby raising finger 81 in position to engage and rock lever 80 when slide 82 is reciprocated in a machine cycle. This will engage selector gears 20 of carriage 2 with racks 18 to control the excursions of racks 18, 23 in a machine cycle as previously described. Auxiliary clutch 45 (FIGS. 3A, 16) will be engaged for simultaneous operation with main clutch 41. This will control actuator unit 7 for clearing of digital actuators 26 followed by entry of a multiplicand value therein in accordance with the excursions of the related racks 23 as described. Furthermore follower 183 (FIG. 3) will be operated to disable hold-up clutch lever 175 to provide for completion of the cycle of main clutch 41 as described.

The means operated by main clutch 41 during its first 30° of operation includes a common drive member comprising a power slide 185 (FIGS. 5, 20) which is reciprocated once for each cycle of the clutch. Slide 185 extends transversely of the machine below the rear of the keyboard in a vertically disposed position, and is adapted for transverse reciprocation by pin and slot mounting on the machine framing. Normally power slide 185 is held toward the right. Early in a cycle of clutch 41, slide 185 will be driven toward the left. The slide then will dwell until near the end of the clutch cycle when it will be restored.

The leftward movement of power slide 185 will operate means for moving clutch lever 46 from engagement with pawl 45p of auxiliary clutch 45. Clutch 45 therefore will be engaged for operation with main clutch 41.

A slide 186 (FIGS. 6, 20) normally spring held toward the right will be moved to the left by leftward movement of power slide 185. Slide 186 has an upturned right end which engages a rearwardly extending arm of a bell crank 187. A rightwardly extending arm of bell crank 187 has pivotal connection to the front of a rearwardly extending arm 188 which is supported at its rear by link connection 189 with a crank 190.

Leftward movement of slide 186 will rock bell crank 187 thereby moving arm 188 rearwardly. Rearward movement of arm 188 will cause operation of a transmission train extending across the machine to follower 183 (FIG. 3) which will be rocked clockwise to likewise rock hold-up clutch lever 175 clockwise to disabled position so that main clutch 41 will complete the multiplicand entering cycle.

Figure 19:
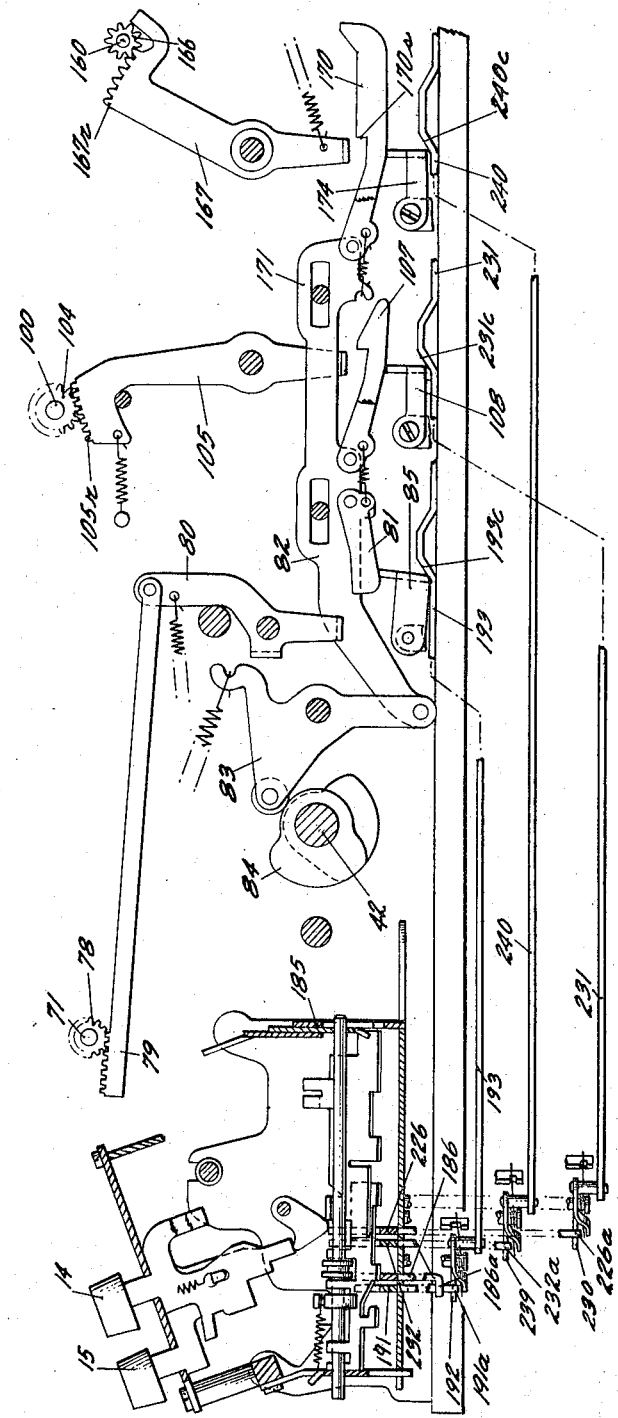
FIG. 19 is a right side elevation of mechanism operable in factor entering operations.

A slide 191 (FIG. 20) extends parallel to the front of slide 186 and a lug 186a extends forwardly from the underedge of slide 186. A depending lug 191a of slide 191 is engaged by the left side of lug 186a. The forwardly extending arm of a bell crank 192 which is spring biased counterclockwise engages the left side of a depending lug 191b of slide 191, and therefore slides 191, 186 will be held normally to the right. A rightwardly extending arm of bell crank 192 is pivotally connected to the front of a rearwardly extending slide 193 which has a cam surface 193c immediately to the rear of the lower edge of bail 85 (FIGS. 18, 19).

In the afore-described leftward movement of slide 186, like movement will be imparted to slide 191 by lugs 186a, 191a, and therefore bell crank 192 will be rocked clockwise to move slide 193 forwardly. Forward movement of slide 193 will bring cam surface 193c into engagement with bail 85 thereby raising said bail and finger 81 to operating position with respect to lever 80.

With the parts adjusted as described above during the 30° operation of main clutch 41, operation of the clutch in completing the cycle will operate the parts to enter a multiplicand into digital actuators 26 of unit 7 as previously described. At the end of the cycle, clutch 41 will be disengaged, key 14 will be released, and the adjusted parts normalized.

*Multiplication (multiplier entry)*

After entry of a multiplicand, digit keys 1 are depressed to enter a multiplier value into selector carriage 2, and then multiplier entry key 15 is depressed.

Main clutch 41 is engaged upon depression of key 15, as described for key 14, and is latched depressed. Furthermore, hold-up clutch lever 175 will be controlled in the same manner as described in multiplicand entry.

Power slide 185 (FIGS. 5, 20) as previously described, is moved to the left during the 30° operation of clutch 41 and is restored near the end of the clutch cycle. Normally disabled means, enabled upon depression of key 15, is operable to step a program shaft 224 a 45° turn counterclockwise during the leftward movement of slide 185 and another 45° turn when the slide is restored.

During the first 45° step of shaft 224, cam means fast on the shaft is operable to move the previously described program slides 186, 191 toward the left, and additionally program slides 232, 233 which also are normally spring held toward the right. The cam means comprises cams 235, 237, 238 operatively associated respectively with the slides 186, 232, 233. Normally the right edge of an upstanding lug of each slide engages a low part of the associated cam. However, during the first 45° step of shaft 224, a lobe of each cam 235, 237, 238 is operable to move and hold the associated slides 186, 232, 233 toward the left. In the movement of slide 186, lug 186a will likewise move and hold slide 191.

The leftward movement of slide 186 will control hold-up clutch lever 175, as previously described, to permit main clutch 41 to continue in its multiplier entering cycle. Also as previously described slide 191 will control operation of means for adjusting selector carriage 2 in position to control the excursions of actuator racks 18, 23.

The leftward movement of slide 232 will, through a lug 232a, rock a bell crank 239 clockwise against the tension of spring means which normally holds said crank counterclockwise. The front of a rearwardly extending slide 240 is connected to an arm of bell crank 239, and clockwise movement of the crank will move slide 240 forwardly. A cam surface 240c of slide 240 is normally immediately to the rear of the underedge of bail 174; and therefore forward movement of the slide will cause bail 174 to be raised by the cam surface.

When bail 174 is raised, it will raise arm 170 (FIG. 18) into positoin to operate lever 167 during the multiplier entering cycle of clutch 41, and this will adjust multiplier register 9 to engage storage gears 30 with racks 23 for registration of a multiplier value in accordance with the excursions of said racks as previously described.

Clutch 41 (FIG. 3) is not disengaged when it completes its cycle in the multiplier entering operation, but continues 30° in the next cycle where it will be arrested by hold-up clutch lever 175. This next cycle is for a total taking operation to print the product as later described. Furthermore, in the 30° operation certain program means is operated and product registration is initiated as later described. Movement of slide 233 toward the left controls the operation to prevent disengagement of clutch 41 by clutch lever 43 which, as previously described, is normally operable to disengage the clutch in full cycle position.

Slide 233 has, at its left end, a rearwardly projecting lug which, when the slide is moved to the left, is located above a cam edge at the front of the lower end of a lever 222. Lever 222 is mounted on a cam follower 220 which is rocked counterclockwise by a cam 221 near the end of a cycle of clutch 41. Normally when follower 220 is rocked counterclockwise, the upper end of lever 222 will engage a shoulder of clutch lever 43 thereby rocking said lever to clutch disengaging position. However, when the lug of slide 233 is above the cam edge of lever 222, said lever will be rocked clockwise when follower 220 is rocked counterclockwise and will not engage the shoulder of clutch lever 43 to move said lever to clutch disengaging position. Therefore clutch 41 will continue 30° into the next cycle where it will be arrested by hold-up clutch lever 175.

Near the end of the multiplier printing and entering cycle, power slide 185 will be restored and program shaft 224 will be stepped a second 45°. This will remove the lobe of cam 235 from engagement with the lug of slide 186 and therefore slides 186, 191 will be restored. However, the lobes of cams 237, 238 will remain engaged with the lugs of slides 232, 233 thereby holding these slides to the left. Slide 232 must remain to the left until the end of the cycle to control an operation, later described, in addition to the operation previously described, and slide 233 must remain to the left until the end of the cycle to control the previously described operation of the means for preventing disengagement of clutch 41 at the end of the cycle.

The additional operation controlled by slide 232 is performed by nose 170n of arm 170 (FIG. 18) which is carried by slide 171. When slide 232 is to the left, bail 174 is operated to raise arm 170 thereby moving nose 170n from a position below to a position in front of the end of a depending arm of a bell crank 176.

It will be recalled that during a cycle of clutch 41, slide 171 is moved forwardly from a normal intermediate position, then rearwardly beyond said normal position, and then forwardly to said normal position. In the movement to the rear beyond the normal position, nose 170n will engage and rock bell crank 176 counterclockwise. This movement of crank 176 sets certain control devices operable in product registration as later described.

In the 30° step of clutch 41 for the product printing and total taking cycle, program shaft 224 will be rotated a third 45° step and the lobes of cams 237, 238 will be removed from engagement with the lugs of slides 232, 233 and these slides will be restored. Furthermore, during this step of shaft 224, cam means fast on the shaft is operable to move program slides 226, 227 toward the left from normal right spring retracted position.

The cam means for slides 226, 227 comprises cams 228, 229. Normally the right edge of an upstanding lug of each slide angages a low part of the related cam. During the third 45° step of shaft 224, a lobe of each cam is operable to move and hold the related slides 226, 227 to the left.

Slide 226 includes a depending lug 226a engaging a forwardly extending arm of a bell crank 230. Crank 230 includes a rightwardly extending arm to which is connected the front of a rearwardly extending slide 231. Accordingly, when slide 226 is moved to the left, crank 230 will be rocked clockwise, and slide 231 will be moved forwardly.

Slide 231 includes a cam surface 231c which normally is immediately to the rear of the underedge of bail 108. Accordingly, forward movement of slide 231 will engage surface 231c with bail 108 to raise the bail thereby raising hook arm 107 (FIGS. 18, 19) to operating position with respect to lever 105. Therefore when clutch 41 is reengaged to complete its cycle as later described, a product total will be taken from wheels 25 of product register 6 as previously described.

The leftward movement of slide 227 is operable to initiate product registration. Slide 227 includes a depending lug 227a which engages a rearwardly extending arm of a bell crank 234. A rightwardly extending arm of crank 234 is connected to the front of a rearwardly extending slide 236. Leftward movement of slide 227 will rock crank 234 counterclockwise and move slide 236 rearwardly. This movement of slide 236 will initiate product registration as described in the next section.

*Multiplication (setting operations and initiation of product registration)*

Control devices operable in product registration are set to enabled position upon counterclockwise movement of bell crank 176 (FIG. 18) which movement, as previously described, is effected by nose 170n of arm 170 near the end of a multiplier entering cycle of main clutch 41. The control devices which are set to enabled position include registration and carriage shift control means, shift direction control means, and means operable upon completion of product registration to initiate a total taking operation to print the product.

The registration and shift control means comprises a sensing lever 242 (FIGS. 1b, 8, 9, 25) for each control cam 31 of multiplier storage gears 30 of register 9. Levers 242 are fulcrumed on shaft 168 on which detents 165 for intermediate gears 163 also are fulcrumed. Each lever 242 is in the plane of a related cam 31 and is spring urged counterclockwise to engage a nose at the end of a forwardly extending arm thereof with the top edge of said cam. Each lever 242 includes an upstanding arm 242a which is provided with a shoulder 242s at its upper end.

A forwardly extending finger 243 is pivotally attached at its rear to the upper end of arm 242a of each sensing lever 242; and each finger, intermediate its ends, includes an upstanding lug 243c. A guide comb 244 supports fingers 243, adjacent their front ends, for longitudinal and vertical movement.

A setting bail 245 extends transversely across the tops of arms 242a of sensing levers 242 and includes a pair of forwardly extending arms by which it is fixed for rocking movement with a transverse shaft 246 which is rotatably mounted in frame plates 114.

Normally all of the storage gears 30 will stand at "0" position with all of the sensing levers 242 held in a clockwise position by high parts 31z of cams 31 and with shoulders 242s immediately to the rear of bail 245 which is spring urged clockwise. Bail 245 therefore will be lowered in front of shoulders 242s thereby blocking counterclockwise movement of levers 242 when high parts 31z of cams 31 are moved from engagement with said levers upon entry of multiplier digits into gears 30.

A selection cam lug 27s (FIGS. 9, 12, 25) extends upwardly at the rear of carriage 27 of actuator unit 7. When carriage 27 is in right home position, lug 27s will engage the front underedge of finger 243 related to the lowest order storage gear 30 thereby holding said finger in a raised enabled position. As carriage 27 is left shifted, as later described, fingers 243 will be raised successively from lower to higher orders.

A registration and shift control bail 247 extends transversely above fingers 243 immediately forward of lugs 243c when sensing levers 242 are in normal clockwise "0" indicating position (FIG. 9). Bail 247 is supported by a pair of rearwardly extending arms and is thereby rockably mounted on shaft 246.

A lever 250 (FIGS. 9, 14) is fulcrumed on a transverse shaft 251 forwardly and above bail 247 and includes an arm extending rearwardly above said bail. Lever 250 is spring urged clockwise to engage bail 247 thereby holding said bail downwardly in engagement with raised enabled finger 243 immediately in front of lug 243c when the related storage gear 30 is in "0" position.

A shortcut registration control bail 248 extends transversely above fingers 243 forwardly of bail 247 and is supported by a pair of rearwardly extending arms and is thereby rockably mounted on shaft 246. Bail 248 is of lesser height than bail 247 and therefore is not engaged and urged downwardly by lever 250, but however is urged downwardly by independent spring means to engage enabled finger 243 forwardly of bail 247.

Lever 250 includes a forwardly extending arm to which the upper end of a depending clutch control cam slide 252 is pivotally connected. The lower end of slide 252 is provided with an opened end slot which is engaged by a stud at the upper end of a lever 253 which is fulcrumed on the machine framing. Lever 253 is spring urged to a normal counterclockwise position and to avoid the necessity for critical adjustment said lever is constructed with upper and lower parts yieldable with respect to one another upon clockwise operating movement (later described).

With the parts in normal position described above, cam slide 252 will be held raised with a nose 252n adjacent its lower end immediately in front of a roller 54r at the lower end of detent lever 54 which is normally spring held clockwise to disengage shift clutch 53. Just below roller 54r is a roller 56r at the upper end of detent lever 56 which is normally spring urged counterclockwise to disengage registration clutch 55.

A leftwardly extending crank 254 (FIGS. 18, 25) is fast at its right end to the right end of shaft 246 exteriorly of the right frame plate 114 and to which shaft bail 245 (FIG. 9) is fast. A pin 254p projects outwardly from the left end of crank 254 and provides pivotal connection for the upper end of a vertically disposed latch slide 255. Slide 255 has an opened end guide slot at its lower end engaging a circumferential groove in a sleeve 256 fixed in right frame plate 114 and which provides bearing means for shaft 116.

The right arms of bails 247, 248 extend rearwardly of shaft 246 on which said bails are pivotally mounted and have respective outwardly turned lugs 247a, 248a. A vertical slide 257 (FIGS. 18, 25) is pivotally connected at its lower end to a leftwardly extending arm of crank 176 and has a vertical guide slot at its upper end engaging a circumferential groove adjacent the right end of shaft 246. Left and right arms at the top of slide 257 respectively rest atop of pin 254p of crank 254 and lugs 247a, 248a. Therefore when crank 176 is rocked counterclockwise near the end of the multiplier entering cycle of main clutch 41, slide 257 will be lowered and bail 245 (FIGS. 9, 25) will be raised from engagement with shoulders 242s of sensing levers 242 while bails 247, 248 will be raised above the level of lugs 243c of fingers 243. As a result, levers 242 related to gears 30 in which multiplier digits "1"–"5" are set will be rocked counterclockwise to engage parts 31p of the related cams 31, whereas levers 242 related to gears 30 in which multiplier digits "6"–"9" are set will be rocked further counterclockwise to engage parts 31n of the related cams. Obviously levers 242 related to gears having a "0" setting will not be rocked.

Fingers 243 of levers 242 which are rocked under control of parts 31p of cams 31 will be moved forwardly to locate their lugs 243c beneath bail 247, whereas fingers 243 of levers 242 which are rocked under control of parts 31n of cams 31 will be moved further forwardly to a position beneath both bails 247, 248.

Crank 176 will be released from the counterclockwise urge of nose 170n of arm 170 near the end of the multiplier entering cycle of main clutch 41; and therefore bails 245, 247, 248 will be released to move downwardly. Setting bail 245 will come to rest atop of the upper ends of arms 242a of those sensing levers 242 which engage the "1"–"9" part of cams 31 and therefore will not be restored downwardly to the front of shoulders 242s of any levers 242 which sense the "0" part of cams 31. Bails 247, 248, however, may or may not be restored downwardly depending on the setting of the lowest order storage gear 30 as follows.

It will be recalled that finger 243 related to the lowest order gear 30 is held raised with respect to the higher order fingers by selection cam lug 27s (FIGS. 9, 12, 25) of carriage 27 normally in rightmost position. If the lowest order gear 30 stands at "0," bails 247, 248 will be restored downwardly to normal position atop the lowest order finger 243 forwardly of lug 243c as shown in full lines (FIG. 9). Therefore cam slide 252 (FIG. 14) will hold its initial setting with nose 252n at the front of roller 54r of detent 54 of shift clutch 53. If, however, lowest order finger 243 is adjusted forwardly to indicate a "1"–"5" setting of lowest order gear 30, bail 247 will be held raised as shown by the dot-dash position (FIG. 9) and lever 250 will be held counterclockwise with cam slide 252 lowered and nose 252n in front of roller 56r of detent 56 of registration clutch 55. Furthermore, if finger 243 is adjusted further forwardly to indicate a "6"–"9" setting of lower order gear 30, bail 248 will be held raised along with bail 247 to control shortcut registration as later described. During the above-described control of the positions of bails 247, 248 by the lowest order raised finger 243, the higher order lowered fingers 243, regardless of their settings, will have no control of the positions of said bails.

Shift direction control means for carriage 27 is set when setting bail 245 is raised thereby moving the aforenoted latch slide 255 downwardly. The shift direction control means includes vertically adjustable slide 136 (FIGS. 14, 21, 22, 23, 25) which, as previously described, is normally in lowered position thereby enabling pawl arm 128 which is operable upon each cycle of clutch 53 to shift carriage 27 one ordinal position to the right. However, slide 136 must be adjusted to raised position to enable pawl 129 for left shift of carriage 27 by clutch 53 during product registration.

Slide 136 is positioned edgewise transversely of the machine and has vertical opened end slots at its upper and lower ends. Pin means in a bracket engages the upper slot, and a lug of another bracket engages the lower slot. Slide 136 is thereby mounted for vertical adjustment and is limited in vertical movement by the ends of the slots engaging the mounting means. Toggle spring 136s holds slide 136 in raised or in the normal lowered right shift control position shown in the drawings.

The means for vertically adjusting slide 136 includes a shuttle 260 having a cylindrical part mounted for front and rear reciprocatory movement and for rotation in a bracket 261 inwardly and rearwardly of slide 136. Means for reciprocating shuttle 260 includes a lever 262 fulcrumed in the machine framing and having a lower forked end engaging a spool fast on said shuttle. Lever 262 extends upwardly and has common pivotal connection at its upper end with the connection of eccentric strap 134 with crank arm 133. Therefore upon each cycle of shift clutch 53, shuttle 260 will be reciprocated first toward the rear of the machine and then forwardly to the normal position shown in the drawings.

Shuttle 260 extends forwardly of slide 136 and inwardly of the inner edge thereof. The forward part of shuttle 260 comprises a right shift cam finger 260a and a diametrically opposed left shift cam finger 260b. Cam fingers 260a, 260b include opposed cam edges which flare radially outward from the cylindrical part of the shuttle toward the front of the machine from a position normally immediately in front of slide 136 (FIGS. 14, 22).

A pair of vertically spaced right and left shift lugs 136a, 136b extend inwardly from slide 136 respectively below and above the cylindrical part of shuttle 260 immediately to the rear of the cam edges of fingers 260a, 260b when said shuttle is in normal forward position. Shuttle 260 is urged counterclockwise (FIG. 21) and clockwise (FIG. 23) to the dotted line right shift position by a spring 260s but is normally restrained in full line left shift position by a slide 263 later described. Furthermore, slide 136 is normally in lowered right shift position wherein right shift pawl arm 128 (FIG. 14) is enabled. The above are the normal relative positions of slide 136 and shuttle 260 wherein carriage 27 is in right home position. With the parts in these positions the operation upon cycling of shift clutch 53 is as follows.

Left shift lug 136b will be in the path of the cam edge of left shift finger 260b when shuttle 260 is reciprocated rearwardly during the first half cycle of shift clutch 53 whereas right shift lug 136a will be out of the path of finger 260a. As a result, finger 260b will engage lug 136b thereby camming slide 136 upwardly to enable left shift pawl arm 129 and to disable right shift pawl arm 128. It will be recalled that the enabled pawl arm 128 or 129 is effective during the last half cycle of clutch 53 and therefore carriage 27 will be shifted toward the left until the end of product registration, later described, when shuttle 260 will be released for rotation by spring 260s to right shift dotted line position wherein finger 260a will be effective to restore slide 136 to right shift position.

The means for holding shuttle 260 in left shift position against the urge of spring 260s comprises slide 263 (FIGS. 21–23) mounted transversely of the machine in suitable guide slots in frame plates 114. Slide 263 extends outwardly from the right frame plate 114 and is there provided with rearwardly turned ear 263a which engages the inner side of finger 260b of shuttle 260. Inwardly of right frame plate 114, slide 263 has an upstanding lug 263b which is engaged by the right end of carriage 27 when said carriage is in right end position to hold slide 263 toward the right and shuttle 260 rocked to left shift position against the urge of spring 260s.

Obviously during the first ordinal left shift of carriage 27 in product registration, later described, the carriage will be moved from engagement with lug 263b and slide 263 would be released and shuttle 260 would be rotated to right shift position. Therefore means is provided to hold slide 263 in left shift control position during product registration. Such means comprises the previously noted latch slide 255 (FIGS. 18, 21–23) attached at its upper end to crank 254 and which therefore will be lowered when setting bail 245 is raised by the setting operation of crank 176 all as previously described. When slide 255 is in normal raised position, its lower end is located immediately above a recess 263c in the upper edge of slide 263 when said slide is held toward the right in left shift position by carriage 27. Therefore when slide 255 is lowered its lower end will engage recess 263c, and shuttle 260 will be held in left shift position when the slide is released by carriage 27 in its initial left shift movement.

Another setting operation is performed when setting bail 245 (FIGS. 9, 25) is raised. This setting operation conditions means operable at the conclusion of product registration to trip hold-up clutch lever 175 (FIG. 3) to reengage main clutch 41 for the total taking operation to print the product.

The tripping means for hold-up clutch lever 175 includes a depending crank 264 (FIG. 15) fast at its upper end adjacent the left end of shaft 246 on which setting bail 245 is fast. A yieldable pin 264p formed of a tightly wound wire extends outwardly from the lower end of crank 264 and normally engages the rear of a slot at the rear end of a forwardly extending link 265. The yieldable connection 264p permits slight excess counterclockwise movement of crank 264 with respect to rearward movement imparted to link 265.

The front end of link 265 has pivotal connection to the rear of a forwardly extending slide 266 (FIGS. 15, 24) which is supported adjacent its front end in a guide slot 267s of a bracket 267. Slide 266 is supported adjacent its rear by a fixed pin 266p which engages a slot 266a in said slide, and a spring 266s normally holds link 266 forwardly to the limit afforded by the rear of slot 266a engaging pin 266p.

A finger 268 is pivotally mounted at its rear intermediate the ends of slide 266 and extends forwardly where it has common support with slide 266 in guide slot 267s of bracket 267. A spring 268s urges finger 268 counter clockwise (FIG. 24) to hold its front end in engagement with the bottom of slot 267s. A shoulder 268a in the lower edge of finger 268 is normally immediately in front of slot 267s and the front end of said finger is in a position slightly above and forwardly of the rear edge of an upstanding lug 269a of an arm 269 which is fast on shaft 177 on which hold-up clutch lever 175 is fast. Arm 269 extends rearwardly and terminates in a lug 269b, and normally in front and slightly above lug 269b is a depending lug 266b of slide 266.

When shaft 246 is rocked counterclockwise to raise bail 245, crank 264 will move link 265, slide 266 and finger 268 rearwardly to the limit imposed by slot and pin mounting 266a, 266p. This will engage the underside of lug 266b with the top of lug 269b thereby preventing hold-up clutch lever 175 of main clutch 41 from moving from clutch disengaging position by vibration or the like during product registration. Furthermore, shoulder 268a of finger 268 will be moved a distance to the rear of slot 267s of bracket 267, and the front end of said finger will be moved to the rear of lug 269a of arm 269. As a result, spring 268s will rock finger 268 counterclockwise to thereby drop the front end of said finger into the plane of lug 269a of arm 269.

When product registration is terminated, as later described, setting bail 245 will be restored downwardly thereby releasing slide 266 for operation by spring 266s. Slide 266 and finger 268 will be moved forwardly to disengage lugs 266b, 269b and to engage the end of said finger with lug 269a. Therefore arm 269 and hold-up clutch lever 175 will be rocked to clutch engaging position and clutch 41 will be reengaged to complete its cycle for printing the total. In this operation, slide 266 and finger 268 will be arrested in forward movement by shoulder 268a engaging bracket 267 below slot 267s. As clutch 41 continues in its cycle, the high part of cam 221 (FIG. 3) will engage the end of clutch lever 175 to rock said lever and arm 269 further in clutch engaging direction. This movement will engage lug 269b with the underedge of finger 268 thereby raising shoulder 268a above the bottom of slot 267s of bracket 267, and raising the end of said finger above lug 269a of arm 269. Then spring 266s will move slide 266 and finger 268 further forward to normal position.

The 30° step of main clutch 41 for the product and total taking cycle has been described, and the attendant movement of program slide 227, crank 234, and rearward movement of slide 236 (FIG. 20) to initiate product registration.

Slide 236 has an upstanding ear adjacent its rear to which the front of a rearwardly extending finger 270 (FIG. 14) is pivotally connected. The lower end of a vertical link 271 is pivotally connected intermediate the ends of finger 270 and is slidably supported adjacent its upper end by a fixed pin engaging a slot in said link. Spring means normally holds link 271 raised to the limit imposed by the pin and slot mounting; and thus holds the rear end of finger 270 raised to a position in front of the lower end of a depending arm of a lever 272 which is normally spring held clockwise. An upper arm of lever 272 engages a lug on the lower arm of the previously noted lever 253 which is normally spring held counterclockwise.

When lever 253 is in normal counterclockwise position, a lug 253a at its lower end is seated between the lower ends of a pair of scissor levers 273, 274 (FIGS. 14, 14A). The lower arms of scissors 273, 274 are urged toward one another by connecting spring means to normally engage lug 253a as shown in FIG. 14; scissor 273 being urged clockwise and scissor 274 counterclockwise.

A spring 275 urges scissor 273 clockwise. Therefore if lug 253a is removed from between the scissors they will close and be urged as a unit clockwise by spring 275. Means, however, is operable to restrain the scissors from such clockwise movement as a unit when carriage 27 is in normal rightmost position. Such means comprises the aforenoted slide 263 (FIGS. 21-23) which is held toward the right when carriage 27 is in rightmost position.

Slide 263 includes a cam nose 263n at its right end. Scissor 273 includes an upstanding arm 273a. When slide 263 is in rightmost position, nose 263n will engage the rear edge of arm 273n thereby blocking scissor 273 from clockwise rotation.

Upon rearward movement of slide 236, finger 270 will engage and rock lever 272 counterclockwise and lever 253 clockwise. This will swing cam slide 252 counterclockwise about its pivotal connection with lever 250 thereby moving nose 252n toward the rear. Nose 252n, as previously described, will be in front of roller 54r, if there is "0" value in the lowest order multiplier storage gear 30 and will be in front of roller 56r if there is a value "1"–"9" in said storage gear. Accordingly rearward movement of nose 252n will rock clutch lever 54 or clutch lever 56 to engage shift clutch 53 or registration clutch 55 to initiate product registration.

During product registration, scissors 273, 274 will prevent lever 253 from being restored counterclockwise, and therefore nose 252n of cam slide 252 will be maintained in rear position to hold clutch levers 54, 55 alternately rocked to clutch engaging position. When lever 253 is rocked clockwise, lug 253a will be removed from its seat between scissors 273, 274. At this time, nose 263n of slide 263 will restrain scissor 273 from clockwise movement by spring 275 and therefore scissor 274 will rotate a short distance counterclockwise to engage scissor 273. At this point, it will be noted that scissor 274 is slightly longer than scissor 273, and therefore when the scissors are closed, a step 274s will be formed by the engaged ends of the scissors for a purpose later described.

During the first cycle of shift clutch 53 (FIG. 14) in the ensuing program of product registration, a pin 53p on the driven member of the clutch will engage the top of link 271 to move it downwardly and lower finger 270. This will release lever 272 which will be restored clockwise; however, lever 253 will be blocked from counterclockwise restoring movement by lug 253a engaging the end of scissor 274, and thus cam lever 252 will be maintained in operated position.

*Product registration*

Normally digital actuators 26 of unit 7 (FIGS. 1b, 8, 9, 11, 12) are set, as previously described, for additive registration of the multiplicand digits entered therein and counting finger 203 (FIG. 15) is enabled to count storage gears 30 in subtractive direction to "0." This setting for normal registration is maintained when a multiplier digit of "1"–"5" is in the active storage gear 30. When the multiplier digit in the active storage gear is "6"–"9," shortcut registration is indicated and the setting of actuators 26 will be changed for subtractive registration by complemental addition and counting finger 204 will be enabled to count the active storage gear additively to "0." Furthermore, in the shortcut operation wherein the multiplier storage gear is counted additively to "0," shift clutch 53 (FIG. 14) in the following cycle will operate means for adding the digit "1" to the multiplier digit in the next higher order storage gear.

Regardless of the type of registration (normal or shortcut), movement of a storage gear to "0" will operate means for disengaging registration clutch 55 at the end of the current cycle and engaging shift clutch 53. With shift clutch 53 engaged, carriage 27 and the counting unit comprising gears 194, 195, 196 will be ordinally shifted toward the left until the counting unit is in active relation with a storage gear 30 containing a significant digit. This shifting movement will operate means for disengaging shift clutch 53 at the end of the current cycle and engaging registration clutch 55. Thus alternate operation of the registration and shift clutches will be effected until the highest order storage gear containing a significant digit is counted to "0." The control of the alternate operation of the registration and shift clutches follows.

Cam slide 252 is held rocked counterclockwise by engagement with the end of scissor 274, as described, with nose 252n toward the rear to engage shift clutch 53 or registration clutch 55. A review of the position of the parts if there is a significant digit in the lowest order storage gear 30 is appropriate at this time. Bail 247 (FIGS. 9, 25) will be raised by lug 243c of the forwardly positioned lowest order finger 243 which will be raised by selection cam lug 27s of carriage 27 in its right end position. Accordingly, lever 250 will be counterclockwise and slide 252 (FIG. 14) will be lowered with nose 252n engaging roller 56r thereby holding clutch lever 56 rocked in clutch engaging position.

When the lowest order storage gear 30 is counted to "0" position, the related sensing lever 242 will be rocked clockwise by high part 31z of the related cam 31. This will move the connected finger 243 toward the rear thereby moving lug 243c from engagement with the underedge of bail 247. Bail 247 therefore will be restored downwardly and lever 250 will be rocked clockwise thereby moving cam slide 252 upwardly. This will move nose 252n from engagement with roller 56r and into engagement with roller 54r. As a result, clutch lever 56 will be released and moved to clutch disengaging position while clutch lever 54 will be rocked to clutch engaging position by the cam edge at the side of nose 252n and then held by said nose.

The above operation will occur during the first part of a cycle of registration clutch 55 because the effective stroke of the counting finger 203 or 204 occurs at that time in the cycle. Therefore, while clutch 55 is completing its cycle, shift clutch 53 will be engaged. However the carriage shift will not occur until the last half of the cycle of clutch 53 at which time clutch 55 will be disengaged and left shift pawl arm 129 will be effective. As carriage 27 is shifted to the next higher ordinal position, selection cam lug 27s will raise the next higher order finger 243 while releasing the lowest order finger. Raising of the higher order finger, however, will not raise bail 247 unless lug 243c of said finger is forwardly under said bail indicating a significant digit in the higher order wheel 30. Therefore shift clutch 53 will remain engaged until carriage 27 is shifted to an order wherein a lug 243c is beneath bail 247 and then raising of finger 243 will raise the bail.

Raising of bail 247 will lower cam slide 252 thereby causing disengagement of shift clutch 53 at the end of the cycle and reengagement of registration clutch 55. This operation occurs during the last half of the shift clutch cycle during which time pawl arm 129 is effective. Registration clutch 55, therefore, will be engaged a short time before the carriage shift is completed; however because of the idle phase of actuators 26 at the start of each cycle, there will be no interference by the overlapping operation of the clutches.

The alternate operation of the registration and shift clutches will continue until the highest order storage wheel 30 containing a significant digit is counted to "0" after which normalizing operations, later described are initiated.

When the lowest order storage gear 30 has "0" digit setting, the sequence of operations obviously will begin with engagement of shift clutch 53 with the alternate operation of the clutches 53, 55 controlled as described above.

*Product registration (shortcut operation)*

When carriage 27 and the counting unit comprising gears 194, 195, 196 are shifted into an ordinal position wherein the related storage gear 30 has a digit setting of "6"–"9," means is adjusted for operation to change the setting of digital actuators 26 from the normal setting for additive registration to the setting for subtraction by additive complemental registration, and to set ratchet wheels 199, 200 (FIGS. 11, 15) so that counting finger 204 will be operable with respect to wheel 200 to count said storage gear 30 in additive direction to "0." Furthermore, means is adjusted for operation during the shift cycle following the complemental registration, to add the digit "1" in the next higher order storage gear 30. The above provides for the well-known shortcut operation wherein the multiplicand is subtracted the number of times of the tens complement of the multiplier digit and added ten times by adding the digit "1" to the next higher order multiplier digit.

Shaft 121 (FIGS. 11, 15, 25) on which cylindrical cams 120 and 202 are fast is normally held clockwise by spring 122, as previously described to maintain actuators 26 set for normal registration and ratchet wheel 199 in the plane of counting finger 203 for subtractive count out of the entrained multiplier storage gear 30. Furthermore, it will be recalled that counterclockwise movement of shaft 121 will set the actuators for complemental registration and set ratchet wheel 200 in the plane of counting finger 204 for additive count out of the storage gear 30.

Means for setting shaft 121 counterclockwise includes an upstanding crank 276 (FIGS. 25, 26, 27) fast on the right end of shaft 121 exteriorly of right frame plate 114. A lever 277 is fulcrumed on a stud 278 fixed in the machine framing and a lower arm of said lever has an undercut shoulder 277s extending rearwardly from its front edge. Normally (FIGS. 25, 26) the front edge of the lower arm of lever 277 engages a pin 276p at the upper end of crank 276 with shoulder 277s intermediate the top and bottom of said pin.

A pin 277a projects from the lower arm of lever 277 below fulcrum stud 278, and a pin 277b projects from an upper arm of said lever above said fulcrum stud. An upstanding hook arm 279 is pivotally connected at its lower end to a depending arm of lever 133 which, as previously described, is rocked by eccentric strap 134 of shift clutch 53. Spring means 280 urges hook arm 279 counterclockwise in engagement with pin 277a of lever 277 and therefore lever 277 is urged clockwise in engagement with pin 276p of crank 276. Spring 280 however is relatively weak and cannot overcome spring 122 (FIG. 11) which holds shaft 121 and crank 276 clockwise.

A ratchet wheel 281 is fast adjacent the right end of shaft 198 exteriorly of right frame plate 114. It will be recalled that shortcut gear 196 (FIG. 11) is splined on shaft 198 on which intermediate counting gear 195 is loosely mounted, that intermediate gear 195 is entrained with a storage gear 30 as determined by the ordinal position of carriage 27, and that gear 196 is entrained with the next higher order storage gear.

Upon each cycle of shift clutch 53, lever 133 will be rocked counterclockwise and restored. This will move hook arm 279 down and then up. Normally the hook of arm 279 is above wheel 281 and will move idly past said wheel when its moves downwardly. However, as later described, hook arm 279 will be adjusted counterclockwise to the position of FIG. 27 and upon subsequent downward movement will engage a tooth of wheel 281 thereby rotating said wheel a step clockwise. This step of wheel 281 will rotate shaft 198 and shortcut gear 196 to enter a digit "1" in the entrained storage gear 30.

The rear end of a horizontal plunger 282 is adapted to engage pin 277a to rock lever 277 to the normal counterclockwise position to FIGS. 25, 26 or to engage pin 277b to rock said level clockwise to the position of FIG. 27. The front end of plunger 282 is pivotally connected to an upstanding arm of a cam follower in the form of a bell crank 283 which is spring urged into engagement with a cam 284. Cam 284 is fast on a shaft 285 driven by a gear 286 which is driven at a one to one ratio by a gear 287 fixed to the output shaft of registration clutch 55. Normally follower 283 engages the low part of cam 284 and the follower will be counterclockwise thereby holding plunger 282 forwardly. In the first part of a cycle of registration clutch 55, cam 284 will rock follower 283 clockwise thereby moving plunger 282 rearwardly, and at the end of the clutch cycle, follower 283 and plunger 282 will be restored.

Means is provided to lower and to raise the rear end of plunger 282 for engagement upon rearward movement with the respective pins 277a, 277b of lever 277. Such means includes a vertical link 288 pivotally attached at its lower end intermediate the ends of plunger 282 and pivotally attached at its upper end to the end of an arm 248b projected forwardly from the right front of shortcut bail 248.

When a storage gear 30 contains a multiplier digit "6"–"9," the related sensing lever 242 will engage low part 31m of the related cam 31 and will be rocked to its extreme counterclockwise position thereby moving the connected finger 243 to the forwardmost position shown in dot-dash lines (FIG. 9). Lug 243c, therefore, will be beneath shortcut bail 248 as well as bail 247 the operation of which has been previously described. As a result, when carriage 27 is shifted into the corresponding ordinal position and finger 243 is raised by selection cam lug 27s, lug 243c will be effective to raise both bails 247, 248.

The raising of bail 248 will raise the rear end of plunger 282 to a position immediately in front of pin 277b of lever 277 (FIG. 27). Accordingly when plunger 282 is moved to the rear during the first part of the first cycle of registration clutch 55 after the carriage shift, the rear end of said plunger will engage pin 277b to rock lever 277 clockwise and crank 276 counterclockwise thereby setting actuators 26 for complemental registration and ratchet wheel 200 for additive count out of the entrained storage gear 30. The above operation will occur at the very start of the cycle of clutch 55 during which time actuators 26 have an idle phase of operation and before counting finger 204 (FIG. 15) is appreciably moved by the operation of eccentric 210 which is normally at a dead center position.

When lever 277 is rocked clockwise and crank 276 counterclockwise, as described above, shoulder 277s will pass above pin 276p and crank 276 will be rocked a distance to locate pin 276p beyond the dead center of said crank and lever as shown in FIG. 27. As a result, when plunger 282 is restored and lever 277 is released thereby, the clockwise urge of crank 276 by spring 122 will not restore the parts which will be locked in operated position by the upward pressure of pin 276p against the underedge of shoulder 277s. This locking action is augmented by the angle of shoulder 277s which is inclined slightly upward from front to rear.

When storage gear 30 is counted to "0," finger 243 (FIG. 9) will be restored and bails 247, 248 will be released by lug 243c. Therefore bail 247 will drop thereby causing engagement of shift clutch 53 and disengagement of registration clutch 55 at the end of the current cycle as previously described. At this time, however, bail 248 and plunger 282 will not drop to their normal lowered position because said plunger will be in rearward position with its end above and to the rear of pin 277a which will block the downward movement. Near the end of the cycle of clutch 55, plunger 282 will be moved forwardly permitting bail 248 and the plunger to drop thereby locating the plunger end in front of pin 277a.

With lever 277 held in clockwise position (FIG. 27), hook arm 279 will be counterclockwise in effective position with respect to ratchet 281. Therefore during the first part of the ensuing cycle of shift clutch 53, the digit "1" will be entered into the next higher order storage gear 30. It will re recalled that clutch 53 does not effect the shifting operation of carriage 27 until the last half of a cycle, and therefore the digit "1" will be entered in the next higher order storage gear 30 before the carriage is shifted into that order.

When carriage 27 is shifted into the next higher order, plunger 282 will remain lowered if there is a "1"–"5" digit setting in the higher order storage gear 30. In this event, when plunger 282 is powered toward the rear, it will engage pin 277a to restore lever 277, crank 276 and hook arm 279 thereby restoring the registering mechanism for normal operation. However, if the multiplier digit setting is "6"–"9," plunger 282 will again be raised and will operate idly with the prior setting of the parts for complemental registration being maintained.

It has been noted that setting bail 245 will be restored downwardly when the highest order storage gear 30 in which a significant digit is entered is counted to "0," and that the restoring movement will terminate product registration and initiate certain normalizing operations. When the highest order significant multiplier digit is "6"–"9," a shortcut multiplier digit "1" is entered into the next higher order storage gear, as described above. However, the entry of the shortcut digit "1" is made by operation of shift clutch 53 after the digit "6"–"9" is counted to "0." Therefore means is provided to prevent restoration of bail 245 until the highest order shortcut digit "1" is counted to "0."

The means for preventing restoration of bail 245 after the highest order multiplier digit "6"–"9" is counted to "0" comprises a depending latch member 289 (FIGS. 18, 26, 27) pivotally mounted at its upper end on a stud in right frame plate 114. Latch 289 is bent over at its top and comprises an inner arm, and an outer arm having a slot at its lower end engaging pin 277b of lever 277.

When lever 277 is in normal counterclockwise position, latch 289 is held clockwise with the lower end of its inner arm forwardly and slightly above the level of pin 254p of crank 254 when bail 245 is raised. Accordingly when lever 277 is rocked clockwise for the shortcut operation, latch 289 will be rocked counterclockwise to position the end of its inner arm above pin 254p; and therefore when the digit "6"–"9" is counted to "0," bail 245 cannot drop because connected crank 254 is blocked from clockwise movement.

When carriage 27 is shifted into the order wherein the shortcut digit "1" is entered, lever 277 will be restored during the first part of the ensuing cycle of registration clutch 55 as previously described. This will restore latch 289 thereby releasing crank 254, and therefore when the digit "1" is counted to "0" bail 245 will be restored downward at the same time that bail 247 is restored which operates, as previously described, to engage shift clutch 53 and disengage registration clutch 55 at the end of the cycle.

When both bails 245 and 247 are restored, all of the storage gears 30 have been counted to "0" and product registration is completed at the end of the current cycle of registration clutch 55; and therefore certain normalizing operations and the total taking operation to print the product are instituted.

Normalizing operations and product printing

Direction control shuttle 260 (FIGS. 14, 21–23) for the shifting mechanism of carriage 27 is held in left shift position against the urge of spring 260s by slide 263 which is latched by slide 255, as previously described, during product registration. However, when setting bail 245 (FIG. 9) is restored downwardly indicating the last cycle of registration clutch 55 in registration of the product, crank 254 (FIG. 18) will be rocked clockwise thereby raising latch slide 255 from recess 263c and releasing slide 263. As a result, spring 260s will rock shuttle 260 to right shift control position thereby moving slide 263 toward the left.

Movement of slide 263 toward the left will move cam nose 263n from engagement with upstanding arm 273a of scissor 273 (FIGS. 14, 14A). Scissors 273, 274 therefore will be rocked as a unit clockwise by spring 275. This will move the lower end of scissor 274 from engagement with lug 253a of lever 253 and engage the lower end of scissor 273 with said lug thereby locating shoulder 274s in front of said lug.

Bail 247 will be restored simultaneously with bail 245 and therefore shift clutch 53 will be engaged and the shifting mechanism will be operated to shift carriage 27 toward the right to home position. Upon movement of carriage 27 to home position, the right end of the carriage will engage lug 263b of slide 263 thereby restoring said slide to the right. Accordingly cam nose 263n will reengage arm 273a of scissor 273 thereby rocking said scissor counterclockwise. Scissor 274, however, cannot follow the counterclockwise movement of scissor 273 because shoulder 274s will engage lug 253a of lever 253 thereby blocking such movement. As a result, the scissors will open and lever 253 will be rocked counterclockwise to seat lug 253a between the scissors. Counterclockwise movement of lever 253 will rock cam slide 252 clockwise thereby moving nose 252n from engagement with roller 54r of clutch lever 54 which will therefore be released to disengage shift clutch 53 at the end of the cycle. Furthermore, the movement of slide 263 to right normal position will engage ear 263a with finger 260b of shuttle 260 thereby rocking said shuttle to left shift controlling position.

When bail 245 is restored downwardly, crank 264 (FIG. 15) is rocked clockwise thereby restoring slide 266 forwardly. Forward movement of slide 266 will rock hold-up clutch lever 175 clockwise (FIG. 3) to reengage main clutch 41, as previously described, to complete its cycle. Controls were set during the 30° step of clutch 41 for taking a total from product register 6, therefore in the operation of clutch 41 after reengagement, the product will be printed.

At the end of the total taking cycle, clutch 41 will be disengaged and key 15 (FIGS. 2, 5) will be released. Furthermore near the end of the cycle, program shaft 224 (FIG. 20) will again be stepped and program slides 226, 227 will be restored as the cams on the shaft are brought into position for the next multiplicand entering operation.

The devices of the invention and their principles of operation could obviously be incorporated in a machine wherein the product and multiplier storage registers are shiftable, and the digital actuators and counting means are stationary rather than vice versa as in the machine of the present disclosure. Accordingly, the appended claims which recite one part as shiftable relative to another will be construed to cover corresponding structure regardless of which part is shiftable. The invention therefore is to be restricted only as necessitated by the spirit of the appended claims.

I claim:
1. In a calculating machine having
a register; and
cyclic rotary digital actuators for said register adjustable for additive or for subtractive registering operation:
means operable to adjust said actuators for one of said registering operations; and
means operable during a cycle of said actuators to adjust said actuators for the other of said registering operations.
2. The invention according to claim 1 wherein:
said means operable during a cycle of said actuators is operable to adjust said actuators for either of said registering operations.
3. The invention according to claim 1 wherein:
said actuators are unidirectionally rotatable; and
are operable to perform subtraction by addition of the complement of the value entered in said actuators.
4. The invention according to claim 3 wherein:
said actuators are axially adjustable to one position with respect to said register to add the value entered in said actuators, and to another position to subtract said value by adding the complement thereof.
5. The invention according to claim 4 wherein:
each actuator is provided with a series of teeth axially settable with respect to said actuator;
setting means is operable to set the teeth of said actuators axially to represent an entered value, the unset teeth representing the complement of said value; and
said actuators are adjustable axially to one position to bring the set teeth into operating position with respect to said register and to another position to bring the unset teeth into operating position.
6. In a calculating machine having
a product register;
cyclically operable digital actuators for said register;
an ordinal series of multiplier storage devices each settable to "0"–"9" digit positions;
counting means operable upon each cycle of said actuators to count an operatively related storage device one digit position toward "0";
means for ordinally shifting said actuators relative to said register and said counting means relative to said storage devices to operatively relate said counting means with the successive higher order storage devices; and
means for initiating operation of said shifting means upon movement of each storage device to "0";
sensing means operable upon movement of said counting means into operative relation with each storage device to detect one or another range of digit values in said device;
means adjustable to enabled and disabled positions for adding a shortcut digit "1" to the next higher order storage device for said counting means;
means controlled by said sensing means when detecting said one range of values to adjust said adding means to disabled position, and when detecting said other range of values to adjust said adding means to enabled position; and
means for operating said adding means subsequent to operation of said sensing means.
7. The invention according to claim 6 wherein:
said adding means is shiftable with said counting means into operative relation with the next higher order storage device from said counting means.
8. The invention according to claim 6 wherein:
said adding means is operable during operation of said shifting means.
9. The invention according to claim 8 wherein:
said shifting means includes a cyclically operable clutch; and
said adding means is operable by said clutch prior to shifting of said counting means.
10. The invention according to claim 9 wherein:
said adding means includes a member reciprocably operable by said clutch during each cycle in a forward operating stroke and an idle return stroke, and adjustable to disabled and enabled positions.

11. The invention according to claim 6 wherein:
said means controlled by said sensing means to adjust said adding means is operable during a cycle of operation of said actuators.

12. In a calculating machine having
a product register;
cyclic digital actuators for said register operable additively or subtractively;
an ordinal series of multiplier storage devices each settable to "0"–"9" digit positions;
counting means operable upon each cycle of said actuators to count an operatively related storage device additively or subtractively toward "0";
means for ordinally shifting said actuators relative to said register and said counting means relative to said storage devices to operatively relate said counting means with the successive higher order devices; and
means for initiating operation of said shifting means upon movement of each storage device to "0";
sensing means operable upon movement of said counting means into operative relation with each storage device to detect one or another range of digit values in said device; and
means operable subsequent to operation of said sensing means and controlled thereby when detecting said one range of values to cause additive operation of said actuators and subtractive operation of said counting means, and when detecting said other range of values to cause subtractive operation of said actuators and additive operation of said counting means.

13. The invention according to claim 12 wherein:
said means operable subsequent to operation of said sensing means is operable during a cycle of said actuators.

14. The invention according to claim 12 wherein:
said actuators are operable to perform subtraction by addition of the complement of the value entered in said actuators.

15. The invention according to claim 14 wherein:
said actuators are undirectionally rotatable for addition and subtraction, and are axially adjustable to one position with respect to said register to add the value entered in said actuators, and to another position to subtract said value by adding the complement thereof; and
said means operable subsequent to operation of said sensing means is operable to axially adjust said actuators.

16. The invention according to claim 15 wherein:
each actuator is provided with a series of teeth axially settable with respect to said actuators;
setting means is operable to set the teeth of said actuators axially to represent an entered value, the unset teeth representing the complement of said value; and
said actuators are adjustable axially to one position to bring the set teeth into operating position with respect to said register and to another position to bring the unset teeth into operating position.

17. In a calculating machine:
a register;
an ordinal series of cyclic digital actuators for said register unidirectionally rotatable for both addition and subtraction;
a series of teeth on each actuator axially settable with respect to said actuators to correspond to a selected value, the unset teeth corresponding to the complement of said value; and
means operable during a cycle of said actuators for adjusting said actuators axially relative to said register to a position for addition wherein the set teeth are in operating position with respect to said register or axially to another position for subtraction wherein the unset teeth are in operating position.

18. In a calculating machine having
a product register;
cyclic digital actuators for said register operable additively or subtractively;
an ordinal series of multiplier storage devices each settable to "0"–"9" digit positions;
counting means operable upon each cycle of said actuators to count an operatively related storage device additively or subtractively one digit position toward "0";
means for ordinally shifting said actuators relative to said register and said counting means relative to said storage devices to operatively relate said counting means with the successive higher order devices; and
means for initiating operation of said shifting means upon movement of each storage device to "0":
sensing means operable upon movement of said counting means into operative relation with each storage device to detect one or another range of digit values in said device;
means adjustable to enabled and disabled positions for adding a shortcut digit "1" to the next higher order storage device from said counting means;
means operable subsequent to operation of said sensing means and controlled thereby when detecting said one range of values to cause additive operation of said actuators, subtractive operation of said counting means and to adjust said adding means to disabled position, and when detecting said other range of values to cause subtractive operation of said actuators, additive operation of said counting means and to adjust said adding means to enabled position; and
means for operating said adding means subsequent to adjustment thereof.

19. In a calculating machine:
a product register;
cyclic digital actuators for said register settable for additive registration of a value entered therein or settable for subtractive registration by additive registration of the complement of said value;
an ordinal series of multiplier storage devices each settable to "0"–"9" digit positions;
counting means ordinally adjustable to operative relation with the successive order storage devices from lower to higher orders and operable upon each cycle of said actuators to count the operatively related storage device additively or subtractively one digit position toward "0";
sensing means operable to detect one or another range of digit values in the storage device to which said counting means is operatively related; and
means operable under control of said sensing means when detecting said one range of values to set said actuators for additive registration of the value entered therein and to adjust said counting means for subtractive operation, and when detecting said other range of values to set said actuators for additive registration of the complement of said value, to adjust said counting means for additive operation and to add a shortcut digit "1" to the next higher order storage means from that to which said counting means is operatively related.

20. The invention according to claim 19 wherein:
said actuators are unidirectionally rotatable for addition and subtraction; and
are axially adjustable relative to said register to one position for addition of the value entered therein and to another position for addition of the complement of said value.

21. In a calculating machine having
a product register;
cyclically operable digital actuators for said register;

an ordinal series of multiplier storage devices each settable to "0"–"9" digit positions;

counting means ordinally adjustable to operative relation with the successive order storage devices from lower to higher orders and operable upon each cycle of said actuators to count the operatively related storage device one digit position toward "0"; and means for terminating a program of product registration in response to movement of the highest order storage device containing a significant multiplier digit to "0":

sensing means operable to detect one or another range of digit values in the storage device to which said counting means is operatively related;

means adjustable to enabled and disabled positions for adding a shortcut digit "1" from counting means to to the next higher order storage device from the device with which said counting means is operatively related;

means controlled by said sensing means when detecting said one range of values to adjust said adding means to disabled position, and when detecting said other range of values to adjust said adding means to enabled position; and means operable when said adding means is in enabled position to prevent operation of said program terminating means.

22. A calculating machine comprising
a product register
means for performing short cut multiplication, wherein it may be necessary during a particular phase of a multiplication program to subtract a value from the product register, including cyclically operable unidirectional differentially adjustable actuators, for said register, having settable means to enter a selected value and the complement of the value therein;

an ordinal series of multiplier storage devices having defined ranges of values;

counting means operably related to said storage devices to control the cycling of said actuators;

means selectively operable during a cycle of said actuators for effectively subtracting the value in the actuators from the product register by entering the complement thereof into said register, means for entering a short-cut digit one to a storage device when the next lower order storage device has caused the value in said actuators to be effectively subtracted from the product register.

23. The invention according to claim 22 wherein said means selectively operable so that the value in said actuators is effectively subtracted from the product register, is operable to ordinally adjust the relative position of said actuators and said register.

24. The invention according to claim 22 including sensing means to detect one or another of said ranges of values of each multiplier storage device, and means coacting with said sensing means for controlling the operation of said means selectively operable.

25. A calculating machine comprising
a product register
means for performing short cut multiplication, wherein it may be necessary during a particular phase of a multiplication program to add the multiplicand to the product register and during another phase of the program to subtract the multiplicand from said product register, including cyclically operable differentially adjustable digital actuators, for said register, having settable means to enter a selected value and the complement of the value therein;

an ordinal series of multiplier storage devices having defined ranges of digital values;

counting means operable upon each cycle of said actuators to move an operatively related storage device additively or subtractively a digit position, and adjusting means operable during a cycle of said actuators for ordinally altering the relative position of said actuators and said register between one position wherein the value in said actuators is added into said register and another position wherein the value in said actuators is subtracted from said register by adding the complement thereof into said register.

26. The invention according to claim 25 including sensing means coacting with said counting means to detect one or another range of digit values in each multiplier storage device, wherein detection of one range of values causes the cycling of the actuators a number of times related to the multiplier value and wherein detection of another range of values causes cycling of the actuators a number of times related to the complement of the multiplier value.

27. The invention according to claim 24 including sensing means for detecting one or another of said ranges of digit values in each multiplier storage device and means coacting with said sensing means for controlling said adjusting means.

References Cited

UNITED STATES PATENTS

| | | | |
|---|---|---|---|
| 2,229,889 | 1/1941 | Friden | 235—62 |
| 2,379,877 | 7/1945 | Britten | 235—79 |
| 2,744,686 | 5/1956 | Grip | 235—140 |
| 2,886,238 | 5/1959 | Plunkett | 235—63 |
| 3,001,701 | 9/1961 | Frobel | 235—63 |
| 3,005,585 | 10/1961 | Capellaro et al. | 235—63 |
| 3,090,554 | 5/1963 | Malavazos | 235—63 |
| 3,181,786 | 5/1965 | Canevari | 235—60.15 |

FOREIGN PATENTS

| | | |
|---|---|---|
| 819,879 | 9/1959 | Great Britain. |

STEPHEN J. TOMSKY, *Primary Examiner*.